US008441537B2

(12) United States Patent
Hayasaki

(10) Patent No.: US 8,441,537 B2
(45) Date of Patent: May 14, 2013

(54) PORTABLE TERMINAL APPARATUS FOR CAPTURING ONLY ONE IMAGE, AND CAPTURED IMAGE PROCESSING SYSTEM FOR OBTAINING HIGH RESOLUTION IMAGE DATA BASED ON THE CAPTURED ONLY ONE IMAGE AND OUTPUTTING HIGH RESOLUTION IMAGE

(75) Inventor: Makoto Hayasaki, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 289 days.

(21) Appl. No.: 12/752,731

(22) Filed: Apr. 1, 2010

(65) Prior Publication Data

US 2010/0253790 A1 Oct. 7, 2010

(30) Foreign Application Priority Data

Apr. 3, 2009 (JP) ................................. 2009-091531

(51) Int. Cl.
*H04N 5/225* (2006.01)
(52) U.S. Cl.
USPC ........................................ 348/207.1; 382/275
(58) Field of Classification Search .............. 348/207.1; 382/275, 299, 289; 358/3.26
See application file for complete search history.

(56) References Cited

U.S. PATENT DOCUMENTS

| 6,178,270 | B1 * | 1/2001 | Taylor et al. ................... 382/284 |
| 6,400,845 | B1 * | 6/2002 | Volino ........................... 382/176 |
| 6,735,341 | B1   | 5/2004 | Horie et al. |
| 8,098,963 | B2 * | 1/2012 | Takeshima et al. ........... 382/299 |
| 2002/0075389 | A1 * | 6/2002 | Seeger et al. ................. 348/222 |
| 2002/0089596 | A1 * | 7/2002 | Suda ............................. 348/302 |
| 2005/0019000 | A1 * | 1/2005 | Lim et al. ........................ 386/46 |
| 2007/0273750 | A1 * | 11/2007 | Tanaka ....................... 348/14.01 |
| 2008/0019613 | A1 * | 1/2008 | Tanaka .......................... 382/302 |
| 2008/0298639 | A1 | 12/2008 | Tsunekawa et al. |
| 2009/0051766 | A1 * | 2/2009 | Shimbo et al. ................ 348/143 |
| 2009/0052804 | A1 * | 2/2009 | Lewis ............................ 382/298 |
| 2009/0323134 | A1 * | 12/2009 | Megawa ....................... 358/474 |

FOREIGN PATENT DOCUMENTS

JP  2000-13596 A  1/2000

(Continued)

OTHER PUBLICATIONS

Tanaka et al., "Super-resolution: High-resolution Image Reconstruction from Multiple Low-resolution Images", ITE Journal, vol. 62, No. 3, 2008, pp. 337-342.
C. Tomasi et al., "Bilateral Filtering for Gray and Color Images", Proceedings of the 1998 IEEE International Conference on Computer Vision, Bombay, India.

(Continued)

*Primary Examiner* — Roberto Velez
*Assistant Examiner* — Gary C Vieaux
(74) *Attorney, Agent, or Firm* — Birch, Stewart, Kolasch & Birch, LLP

(57) ABSTRACT

An image output apparatus receives a single piece of captured image data from a portable terminal apparatus, and carries out, in accordance with the single piece of captured image data received, a high resolution correction for creating high resolution image data which has a higher resolution than the single piece of captured image data. Then, the image output apparatus carries out an output process in which the high resolution image data created is outputted. This provides a captured image processing system which allows an image output apparatus to output an image captured by a portable terminal apparatus while the image is improving in resolution such as text readability.

15 Claims, 13 Drawing Sheets

FOREIGN PATENT DOCUMENTS

| | | |
|---|---|---|
| JP | 2002-41502 A | 2/2000 |
| JP | 2005-275787 A | 10/2005 |
| JP | 2006-25037 A | 1/2006 |
| JP | 2006-237757 A | 9/2006 |
| JP | 2007-27839 A | 2/2007 |
| JP | 2008-187750 A | 8/2008 |
| JP | 2008-294950 A | 12/2008 |
| JP | 2009-44538 A | 2/2009 |

OTHER PUBLICATIONS

Re:T. Saito, "Super-Resolution Oversampling from a Single Image", ITE Journal, vol. 62, No. 2, pp. 181-189 (2008), The Institute of Image Information and Television Engineers.

U.S. Office Action issued in U.S. Appl. No. 12/752,503 on Mar. 16, 2012.

* cited by examiner

F I G. 1
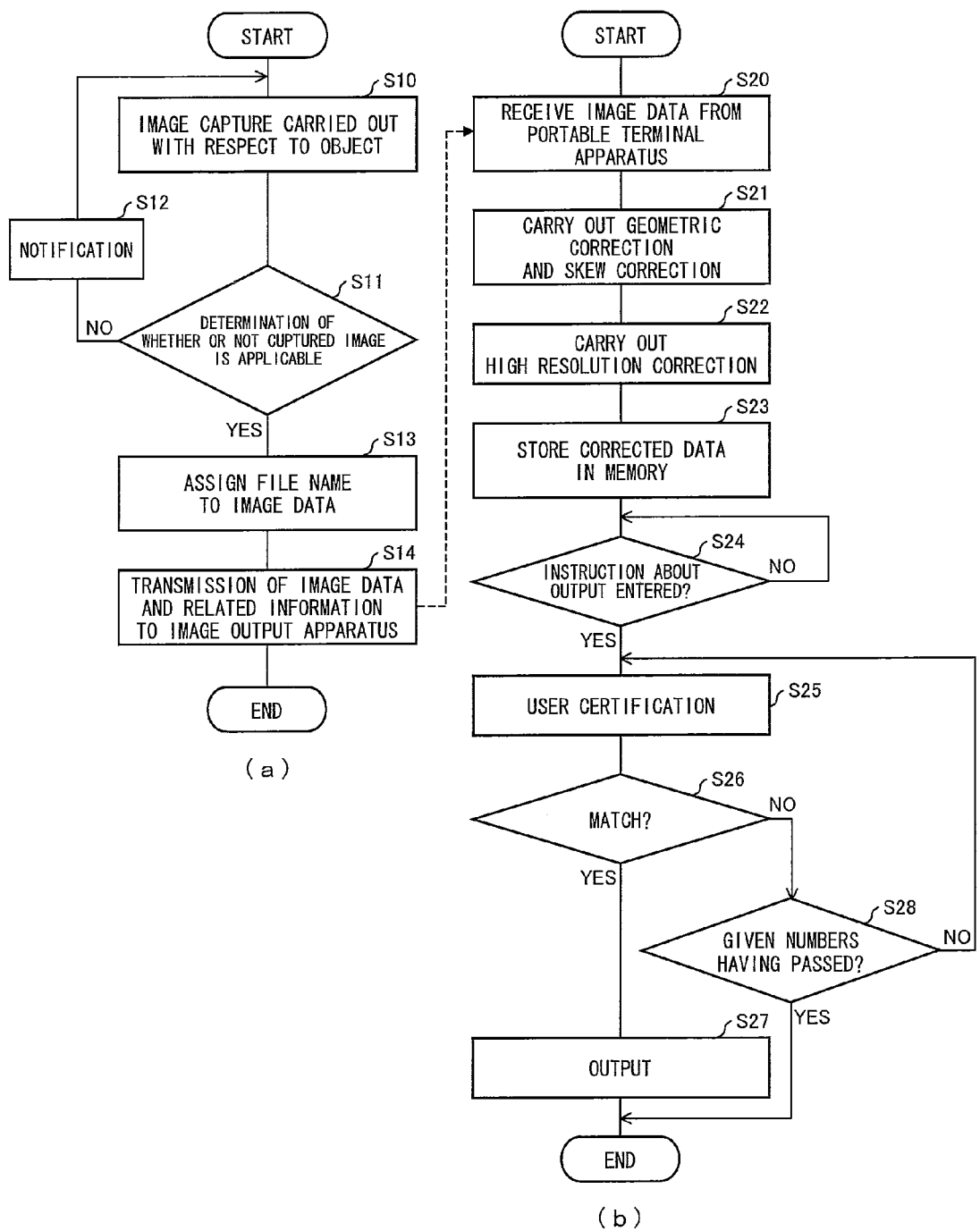

F I G. 5

| tan Θ | Θ |
|---|---|
| −0.17632698 | −10.0 |
| −0.17452794 | −9.9 |
| −0.17272999 | −9.8 |
| −0.17093313 | −9.7 |
| −0.16913734 | −9.6 |
| −0.16734261 | −9.5 |
| −0.16554893 | −9.4 |
| : | : |
| 0.16554893 | 9.4 |
| 0.16734261 | 9.5 |
| 0.16913734 | 9.6 |
| 0.17093313 | 9.7 |
| 0.17272999 | 9.8 |
| 0.17452794 | 9.9 |
| 0.17632698 | 10.0 |

F I G. 1 2
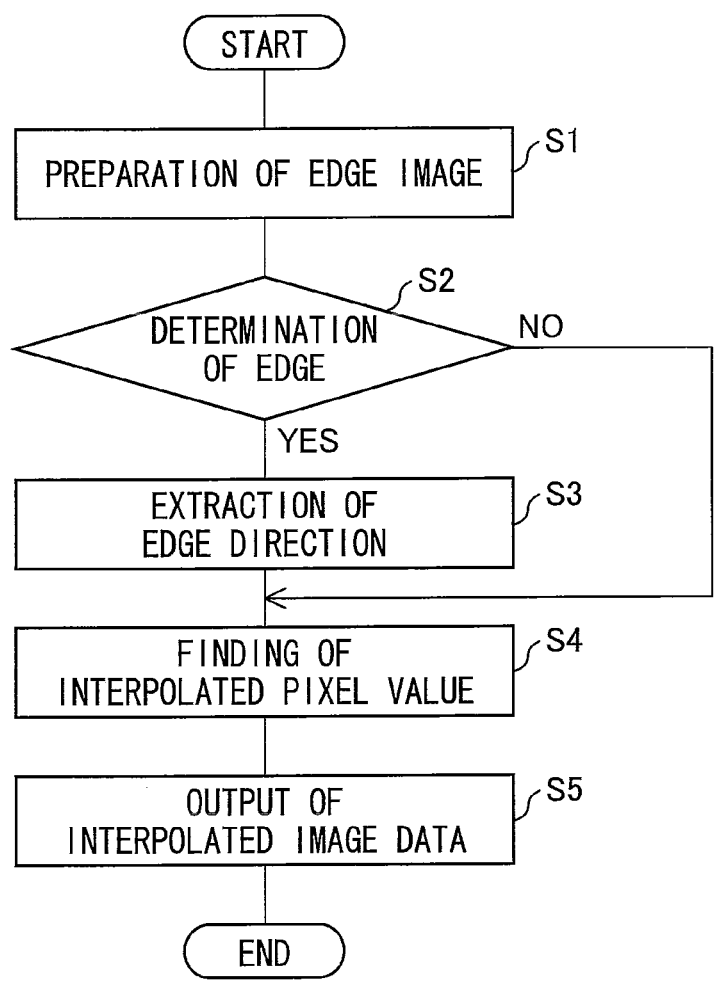

F I G. 1 3
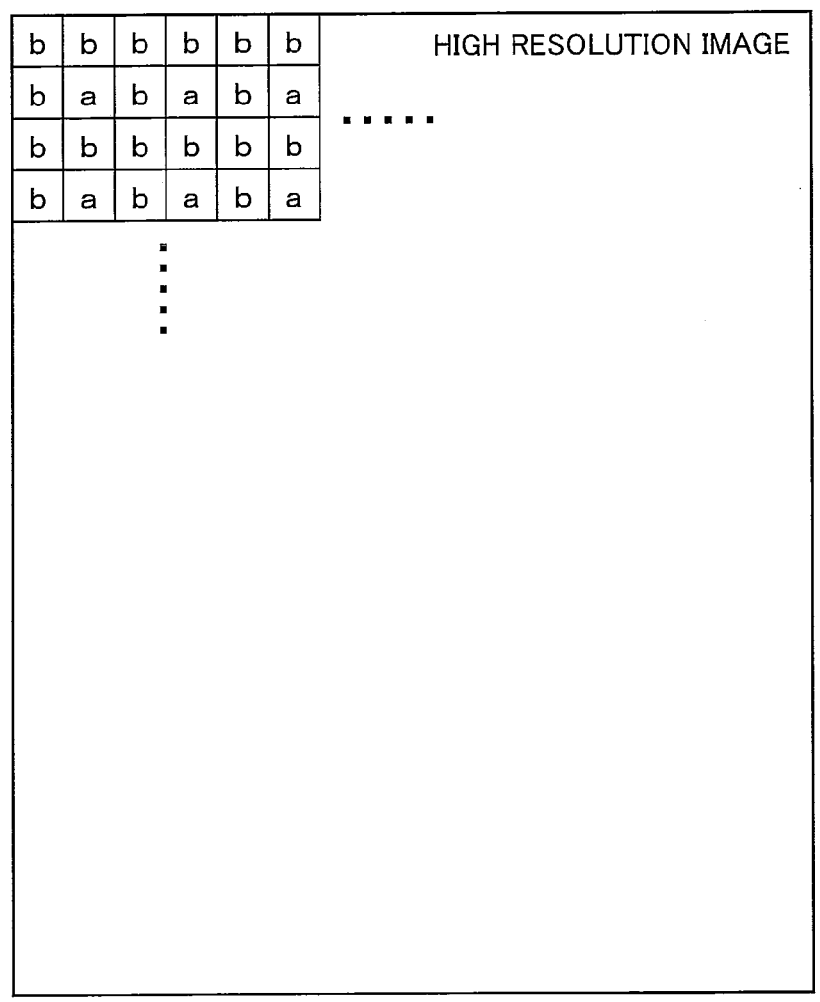

| 0 | −1 | 0 |
|---|----|---|
| −1 | 4 | −1 |
| 0 | −1 | 0 |

FIG. 16

| MN | 0 |
|---|---|
| MN+$\Delta$ | 1 |
| MN+$\Delta \times 2$ | 2 |
| MN+$\Delta \times 3$ | 3 |
| MN+$\Delta \times 4$ | 4 |
| : | : |
| : | : |
| MN+$\Delta \times 255$ | 255 |

$\Delta = (MX-MN)/255$

US 8,441,537 B2

PORTABLE TERMINAL APPARATUS FOR CAPTURING ONLY ONE IMAGE, AND CAPTURED IMAGE PROCESSING SYSTEM FOR OBTAINING HIGH RESOLUTION IMAGE DATA BASED ON THE CAPTURED ONLY ONE IMAGE AND OUTPUTTING HIGH RESOLUTION IMAGE

This Nonprovisional application claims priority under 35 U.S.C. §119(a) on Patent Application No. 2009-091531 filed in Japan on Apr. 3, 2009, the entire contents of which are hereby incorporated by reference.

BACKGROUND OF THE INVENTION

1. Field of the Invention

The present invention relates to a captured image processing system which causes an image output apparatus to output an image captured by a portable terminal apparatus.

2. Description of the Related Art

A mobile phone and wire and wireless technologies have been developed and widespread in tandem with advancement in Internet technology. The technologies make it possible that an image is transmitted, in a place where a user is staying, from a portable terminal apparatus such as the mobile phone to an image output apparatus connected to the Internet so as to be put into print.

For example, according to Patent Literature 1, digital image data, collected by a digital camera or a mobile information device such as a camera-equipped PDA or a mobile personal computer, is transmitted to a server via a network. The server carries out image processing such as a brightness adjustment, a color adjustment, and/or a size adjustment with respect to the digital image data. Then, the server embeds the digital image data in an image area, in which a plurality of document combining templates are stored, so as to prepare a document.

According to Patent Literature 2, in a camera-equipped mobile phone, a target image to be printed is selected, a variety of printing requirements are set, printing is instructed to start, and identification information (a) such as a device name of the mobile phone is transmitted to a printer so as to be registered with the printer. After receiving the identification information (a), the printer transmits identification information (b) such as a device name of the printer to the mobile phone so that the identification information (b) is registered with the mobile phone.

Next, a parameter of a communication speed which is usable for data communication is sent to the printer from the mobile phone. The printer compares the parameter with a usable communication speed for the printer. The printer sends, to the mobile phone, a parameter of the communication speed which parameter is determined to be the most efficient in transmission. The mobile phone alters its communication speed to a communication speed received from the printer, and the printer also alters its communication speed to the communication speed transmitted to the mobile phone. Then, the mobile phone transfers image data to the printer, and the printer receives the image data so as to prepare print data and carry out a printing process.

CITATION LIST

Patent Literature 1
Japanese Patent Application Publication, Tokukai, No. 2002-41502 A (Publication Date: Feb. 8, 2002)
Patent Literature 2
Japanese Patent Application Publication, Tokukai, No. 2007-27839 A (Publication Date: Feb. 1, 2007)

SUMMARY OF INVENTION

Technical Problem

However, an RGB filter or a complementary color (CMY) filter, which is used in a mobile phone or a digital camera, is arranged such that filters are provided for respective colors in a two-dimensional manner. Therefore, an image captured by a portable terminal apparatus has a resolution which is approximately one third to two thirds lower than that of image data scanned by a scanner or the like. This causes, in particular, a problem that the image has poor text readability.

Specifically, an RGB line sensor is used in the scanner or the like. This allows a piece of color data to be scanned for a corresponding pixel. In contrast, according to the mobile phone or the digital camera, (i) filters RGBRGB . . . are provided for respective pixels or (ii) filters RGRGRG . . . /GBGBGB . . . are provided for each line of pixels. This causes a color component for which no filter is provided to exist in each of the pixels, thereby causing a low resolution.

The present invention has been made in view of the problems, and its object is to provide an image output apparatus, a portable terminal apparatus, a capture image processing system, an image output method, and a recording medium, each of which allows an image captured by the portable terminal apparatus to be easily obtained from the image output apparatus while the image is improving in resolution such as text readability.

Solution to Problem

In order to attain the object, an image output apparatus of the present invention includes: a receiving section for receiving, via a communication network, from a portable terminal apparatus including an image capture section, a single piece of captured image data which the image capture section has captured; a correction processing section for carrying out a high resolution correction for preparing, in accordance with the single piece of captured image data received by the receiving section, high resolution image data which has a higher resolution than the single piece of captured image data; and an output section for carrying out an output process in which the high resolution image data prepared by the correction processing section or an image indicated by the high resolution image data is outputted.

An image output method of the present invention, includes the steps of: (a) receiving, via a communication network, from a portable terminal apparatus including an image capture section, a single piece of captured image data which the image capture section has captured; (b) carrying out a high resolution correction for preparing, in accordance with the single piece of captured image data received in the step (a), high resolution image data which has a higher resolution than the single piece of captured image data; and (c) carrying out an output process in which the high resolution image data prepared in the step (b) or an image indicated by the high resolution image data is outputted.

According to the arrangement, the image output apparatus receives, via the communication network, from the portable terminal apparatus, data of an image captured by the portable terminal apparatus. This allows a user (i) to carry out image capture with respect to an image capture object which is provided so as to be away from the image output apparatus and (ii) to transmit, without the need of going to the image output apparatus, captured image data obtained from the image capture.

The image output apparatus prepares high resolution image data in accordance with a single piece of the captured image data received from the portable terminal apparatus, and then outputs the high resolution image data or an image indicated by the high resolution image data. This allows the user to easily obtain, from the image output apparatus, image data or an image which has a higher resolution than the image captured by the portable terminal apparatus. As such, for example, even in a case where image capture is carried out by a portable terminal apparatus with respect to an image capture object including a text image, it is possible to obtain, from the image output apparatus, an image in which a text included in the text image is enhanced in readability.

The image output apparatus of the present invention is preferably arranged such that: an object whose image is captured by the image capture section has a rectangular plane on which a text image is formed; and the correction processing section (i) corrects a distortion of the rectangular plane in the captured image data, the distortion occurring when the image capture section captured image data in a direction different from a normal direction of the rectangular plane and (ii) carries out the high resolution correction.

According to the arrangement, a user can easily obtain an undistorted image from an image output apparatus even if image capture is obliquely carried out with respect to an image capture object.

The image output apparatus of the present invention is preferably arranged such that: an object whose image is captured by the image capture section has a rectangular plane on which a text image is formed; and the correction processing section (i) corrects a lens distortion in which the rectangular plane has a curved edge in captured image data obtained by the image capture section and (ii) carries out the high resolution correction.

According to the arrangement, a user can easily obtain, from an image output apparatus, an image which has no lens distortion.

The image output apparatus of the present invention is preferably arranged such that the output section carries out, as the output process, a printing process in which an image which corresponds to the high resolution image data is formed on recording paper.

According to the arrangement, a user can easily obtain, from an image output apparatus, a printed matter on which an image which has a higher resolution than a captured image is printed.

The image output apparatus of the present invention is preferably arranged such that the output section carries out, as the output process, a storing process in which the high resolution image data is stored in an external storage apparatus. Alternatively, the image output apparatus of the present invention is preferably arranged such that the output section carries out, as the output process, an e-mail transmission process in which an e-mail, to which the high resolution image data is attached, is transmitted.

According to the arrangement, a user can easily obtain, from an image output apparatus, data of an image which has a higher resolution than a captured image.

The image output apparatus of the present invention is preferably arranged such that: an object whose image is captured by the image capture section has a text image; and the output section outputs the high resolution image data in a state where the high resolution image data is separated into (i) a region which corresponds to the text image and (ii) the other region and the regions are compressed at respective different compression ratios.

According to the arrangement, it is possible to cause the high resolution image data to have less capacity. This allows a reduction in load imposed on communication during the output.

The image output apparatus of the present invention is preferably arranged such that: an object whose image is captured by the image capture section has a text image; and the output section extracts a text from a region of the high resolution image data which region corresponds to the text image, converts the text to text data, and then outputs the high resolution image data to which the text data is added.

According to the arrangement, a user can easily carry out a text search by use of text data.

A portable terminal apparatus capable of communicating, via a communication network, with an image output apparatus as mentioned above, said portable terminal apparatus includes: an image capture section for capturing an image of an object having a rectangular plane on which a text image is formed; a captured image determination section for determining whether or not the single piece of captured image data which the image capture section has captured meets a given requirement; and a transmission section for transmitting, to the image output apparatus, captured image data which is determined, by the captured image determination section, to meet the given requirement, the given requirement including a requirement A, the requirement A being such that features fall within a given range, the features indicative of a degree of a distortion of the rectangular plane in the captured image data, the distortion occurring when the image capture section captured image data in a direction different from a normal direction of the rectangular plane.

Note here that examples of the identical image capture object which has the rectangular plane include document paper or a poster on which a text image is formed, a screen projected by a projector or the like, and a screen included in a display device.

According to the arrangement, the portable terminal apparatus transmits the captured image data only in a case where the features indicative of a degree of the distortion fall within the given range. For this reason, the captured image data transmitted to the image output apparatus has a distortion which is relatively small. This allows a transmission, to the image output apparatus, of only captured image data in which the rectangular plane has a relatively small distortion.

Further, a variety of methods have been known as a method for correcting a distortion of the rectangular plane which distortion occurs in the captured image data due to the image capture which is carried out by the image capture section from the direction different from the normal direction of the rectangular plane. However, in a case where the distortion occurs to a large degree, it is difficult to securely obtain an undistorted image even if such a correction is carried out. However, according to the arrangement, the portable terminal apparatus transmits the captured image data only in a case where the features indicative of a degree of the distortion fall within the given range. For this reason, the captured image data transmitted to the image output apparatus has a distortion which is relatively small. This is because the rectangular plane is distorted to the degree that falls within the given range. As a result, in a case where the image output apparatus carries out a correction for the distortion, the distortion can be securely corrected in the image output apparatus.

A portable terminal apparatus capable of communicating, via a communication network, with an image output apparatus as mentioned above, said portable terminal apparatus includes: an image capture section for capturing an image of an object having a rectangular plane on which a text image is formed; a captured image determination section for determining whether or not the single piece of captured image data which the image capture section has captured meets a given requirement; and a transmission section for transmitting, to the image output apparatus, captured image data which is determined, by the captured image determination section, to meet the given requirement, the given requirement including a requirement B, the requirement B being such that a skew angle of the rectangular plane in captured image data falls within a given range.

Assume that a rectangular object is skewed in a captured image. Even if a high resolution image is obtained from an image output apparatus, a document is also skewed in the high resolution image. However, according to the arrangement, the portable terminal apparatus transmits the captured image data only in a case where the angle of the skew falls within the given range. Note here that the given range refers to a range including 0°, for example, within 0±15°. Such a setting allows a prevention of an image which is steeply skewed from being transmitted to the image output apparatus.

The portable terminal apparatus of the present invention is preferably arranged to further include a notification section for notifying a user of need to carry out capture an image again in a case where the captured image determination section determines that no given requirement is met.

According to the arrangement, the user can easily grasp that it is necessary to carry out image capture again so as to obtain a high resolution image from the image output apparatus. This makes it possible to take an immediate step to carry out image capture.

A captured image processing system of the present invention includes: a portable terminal apparatus as mentioned above; and an image output apparatus as mentioned above for receiving captured image data from the portable terminal apparatus.

According to the arrangement, a user can easily obtain a high resolution image which is an image captured by a portable terminal apparatus and has a higher resolution than the image.

Note that it is possible to cause a computer to realize a portable terminal apparatus and an image output apparatus which are mentioned above. In this case, (i) a program for causing a computer to realize the portable terminal apparatus and the image output apparatus by causing the computer to operate as each section mentioned above and (ii) a computer-readable storage medium in which the program is recorded are both encompassed in the scope of the present invention.

Advantageous Effects of Invention

According to the present invention, it is possible to easily obtain, from an image output apparatus, an image captured by a portable terminal apparatus while the image is improving in resolution such as text readability.

BRIEF DESCRIPTION OF DRAWINGS

FIG. 1 is a flow chart illustrating a captured image processing method carried out in a captured image processing system of the present invention. (a) of FIG. 1 illustrates a flow in a portable terminal apparatus, and (b) of FIG. 1 illustrates a flow in an image output apparatus.

FIG. 5 shows angles of a skew θ and their respective tangents which angles and tangents are obtained in the example of detection of the skew which example is illustrated in FIG. 4.

FIG. 12 is a flow chart illustrating a processing flow of a high resolution correction.

FIG. 13 illustrates reference pixels and interpolated pixels in high resolution image data.

FIG. 14(a) is a drawing illustrating a method for calculating pixel values of the interpolated pixels in a case where an edge direction is an upper left-lower right direction.

FIG. 14(b) is a drawing illustrating the method for calculating the pixel values of the interpolated pixels in a case where the edge direction is a left-right direction.

FIG. 14(c) is a drawing illustrating the method for calculating the pixel values of the interpolated pixels in a case where the edge direction is an upper right-lower left direction.

FIG. 14(d) is a drawing illustrating the method for calculating the pixel values of the interpolated pixels in a case where the edge direction is an upper-lower direction.

FIG. 15 shows an example of a first order differential filter.

FIG. 16 illustrates an example of a look-up table used during detection of a color balance of an image.

DETAILED DESCRIPTION OF THE INVENTION

An embodiment of the present invention is described below in detail.

(1) Overall Arrangement of Captured Image Processing System

Figure 2:
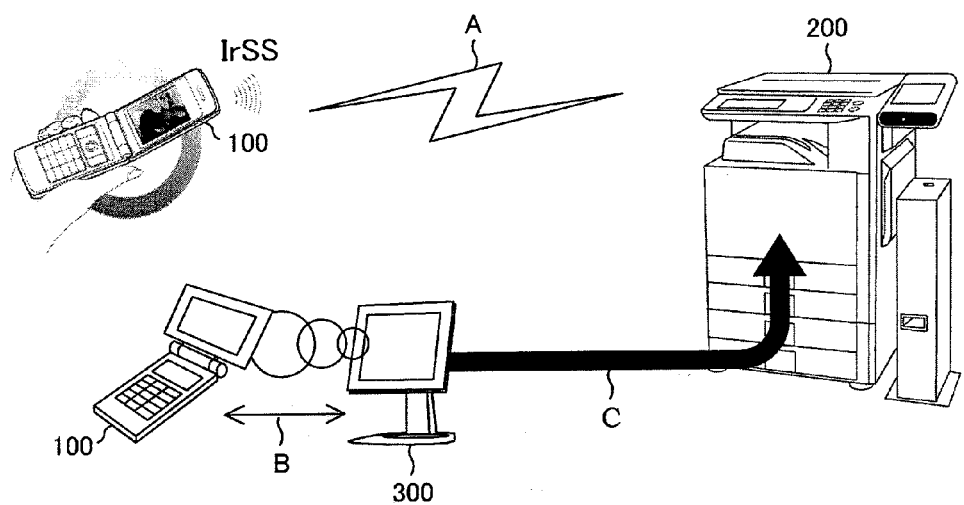
FIG. 2 is a drawing illustrating an arrangement of the captured image processing system of the present invention.

FIG. 2 is a drawing illustrating an overall arrangement of a captured image processing system of the present invention. The captured image processing system includes (i) a portable terminal apparatus 100 including image capture means such as a camera-equipped mobile phone or a digital camera and (ii) an image output apparatus 200 such as a multifunction printer or a printer (an image forming apparatus) (see FIG. 2).

The portable terminal apparatus 100 is carried with a user. The user can cause the portable terminal apparatus 100 to carry out image capture with respect to an object in various scenes. However, an image captured by the portable terminal apparatus 100 has a low resolution as described earlier. Therefore, even in a case where an image having such a low resolution is subjected to an image output process (e.g., printing) by the image output apparatus 200, it may be impossible to recognize details of the image. For example, in a case where image capture is carried out with respect to (a) paper or a poster on which a text image (e.g., a text) is printed or (b) a display screen on which the text image or the like is displayed, the text which has been subjected to the image output process may be illegible. According to the present embodiment, it is possible to obtain an image which has a higher resolution than an image captured by the portable terminal apparatus 100, even in such a case.

According to the present embodiment, the portable terminal apparatus 100 has a function of a text image capture mode in which it is possible to obtain, from the image output apparatus 200, an image which has a higher resolution than an actually captured image.

Note, in the present embodiment, that the user is assumed to select the text image capture mode, in a case where (i) the user carries out image capture with respect to an image capture object (an object whose image is to be captured) which has a rectangular shape such as (a) paper or a poster on which a text image is printed or (b) a display screen on which the text image is displayed (e.g., a display screen and a screen projected by a projector) and (ii) desires to obtain the image which has a higher resolution than the actually captured image.

Note also that it is not always possible for the user to carry out image capture from the front with respect to the image capture object which has a rectangular shape such as (a) paper or a poster on which a text image is printed or (b) a display screen on which the text image is displayed. Namely the user may obliquely carry out image capture with respect to the image capture object, in a state where (i) a normal direction of a plane of the image capture object on which plane the text image is formed and (ii) a direction in which image capture means carries out the image capture do not coincide with each other. In this case, the image capture object undergoes a distortion (hereinafter referred to as a geometric distortion) in the captured image. The present embodiment is arranged to cause the image output apparatus 200 to output an image, in which such a geometric distortion has been corrected, in a case where the text image capture mode is selected.

The portable terminal apparatus 100, which can communicate with the image output apparatus 200, transmits data of the captured image (hereinafter referred to as captured image data) to the image output apparatus 200.

The image output apparatus 200 carries out a high resolution correction for resolution enhancement with respect to the captured image in accordance with the captured image data on an identical image capture object which are received from the portable terminal apparatus 100. The image output apparatus 200 carries out an output process with respect to the captured image whose resolution has been enhanced.

Examples of the output process carried out by the image output apparatus 200 include (i) a printing process carried out with respect to an image in accordance with the captured image data whose resolution has been enhanced, (ii) a filing process for causing the captured image data whose resolution has been enhanced to be stored in a storage device such as a server or a USB memory, and (iii) an e-mail transmission process for transmitting an e-mail to which the captured image data whose resolution has been enhanced is attached.

The portable terminal apparatus 100 can be communicated with the image output apparatus 200 as below. The captured image data is transferred from the portable terminal apparatus 100 to the image output apparatus 200 via a wireless communication system which is in conformity with any one of the infrared communication standards such as IrSimple (see a sign A illustrated in FIG. 2). Alternatively, the captured image data is transmitted from the portable terminal apparatus 100 temporarily to an intermediary apparatus 300 via a non-contact wireless communication system such as Felica (registered trademark) (see a sign B illustrated in FIG. 2) and then transferred from the intermediary apparatus 300 to the image output apparatus 200 via a wireless communication system such as Bluetooth (registered trademark) (see a sign C illustrated in FIG. 2). Note that not only the communication systems but also a system employing a publicly-known method is applicable to the communication between the portable terminal apparatus 100 and the image output apparatus 200.

(2) Arrangement of the Portable Terminal Apparatus

First, the portable terminal apparatus 100 of the present embodiment is described below with reference to FIGS. 3 through 8.

Figure 3:
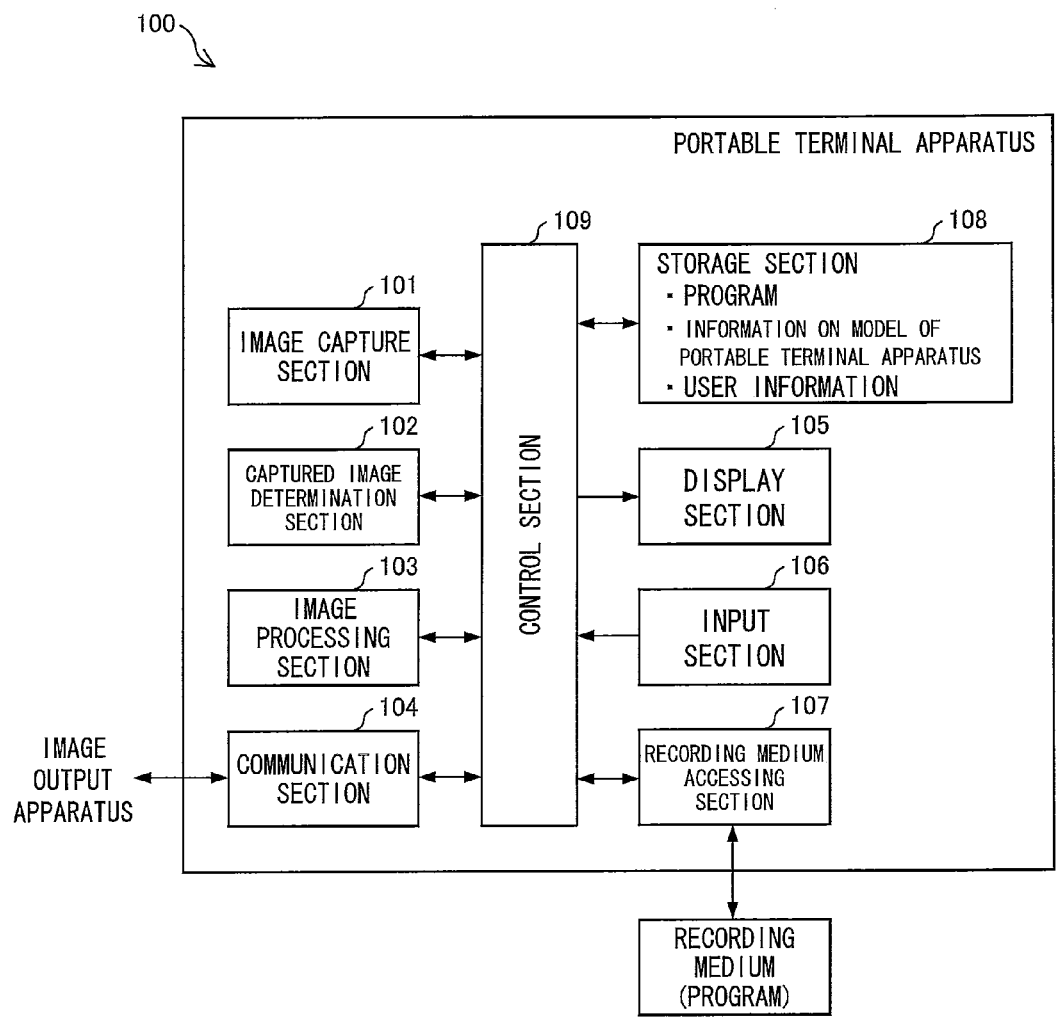
FIG. 3 is a block diagram illustrating an arrangement of the portable terminal apparatus of the present invention.

FIG. 3 is a block diagram illustrating an arrangement of the portable terminal apparatus 100. The portable terminal apparatus 100 includes an image capture section 101, a captured image determination section 102, an image processing section 103, a communication section (transmission section) 104, a display section (notification section) 105, an input section 106, a recording medium accessing section 107, a storage section 108, and a control section (transmission section, notification section) 109.

The image capture section 101 carries out image capture with respect to an image capture object by use of a CCD/CMOS sensor so that a captured image has a predetermined resolution. Note that a single shutter click causes the image capture section to carry out image capture with respect to the image capture object only one time while the text image capture mode is being selected.

While the text image capture mode is being selected, the captured image determination section 102 determines whether or not a captured image captured by the image capture section 101 meets process execution requirements under which a text image is applicably read. The captured image determination section 102 supplies a determined result to the control section 109. Processes carried out by the captured image determination section 102 are described later in detail.

The image processing section 103 carries out at least an A/D conversion process with respect to the data of the image captured by the image capture section 101 (captured image data).

The communication section 104 has functions of serial/parallel transfer and wireless data communication which are in conformity with USB 1.1 or USB 2.0 Standard. The communication section 104 transmits to the image output apparatus 200 the data of the image which is captured by the image capture section 101 and is then subjected to the A/D conversion process by the image processing section 103. Note, however, that the communication section 104 transmits only the captured image data that is determined, by the captured image determination section 102, to meet the process execution requirements.

The display section 105 is realized by a liquid crystal display device, for example. The input section 106, which has a plurality of buttons, serves as a section from which the user enters data.

The storage medium accessing section 107 reads out a program for carrying out the processes in the portable terminal apparatus 100 from a recording medium in which the program is recorded.

The storage section 108 serves as a section in which (i) the program for carrying out the processes in the portable terminal apparatus 100, (ii) information on a model of the portable terminal apparatus 100, (iii) user information, and (iv) data required for carrying out the processes are stored. Note that the user information refers to information, for identifying the user of the portable terminal apparatus 100, such as a user ID and a password.

The control section 109 carries out control with respect to the sections of the portable terminal apparatus 100. Specifically, in a case where an instruction to select the text image capture mode is entered to the input section 106, the control section 109 causes the display section 105 to display a window which urges the user to enter, from the input section 106, a magnification of resolution conversion. Subsequently, the control section 109 determines, in accordance with the magnification (e.g., ×2 or ×4) entered from the input section 6, (i) the number of consecutive times of image capture carried out by the image capture section 101 and (ii) a part of the process execution requirements which is used in the captured image determination section 102. Note that the control section 109 determines the above (i) and (ii) in accordance with information, preliminarily stored in the storage section 108, in which the magnification, the number of times of image capture, and the part of the process execution requirements are associated with each other.

Further, in the case where the instruction to select the text image capture mode is entered from the input section 106, the control section 109 controls the captured image determination section 102 to carry out a determination process with respect to the captured image data indicative of a single captured image captured by the image capture section 101.

The control section 109 attaches, to the captured image data which is determined, by the captured image determination section 102, to meet the process execution requirements, (i) a file name, (ii) the information on the model of the portable terminal apparatus 100 and the user information which are stored in the storage section 108, and (iii) the output process information. Thereafter, the control section 109 causes the communication section 104 to carry out a process of transmitting this captured image data to the image output apparatus 200.

(3) Processes Carried Out by the Captured Image Determination Section

The following description discusses how the captured image determination section 102 of the portable terminal apparatus 100 carries out the determination processes with respect to the process execution requirements.

(3-1) Determination of Skew

As described earlier, the user selects the text image capture mode in a case where the user carries out image capture with respect to the image capture object, which has a rectangular shape, such as paper, a poster, or a display screen and desires to obtain a high resolution image. Therefore, the captured image determination section 102 assumes that the image capture object has a rectangular shape, and detects, in the captured image data, a skew of the image capture object by detecting an edge of the image capture object. Note that a conventionally known method can be employed as a method for detecting, in the captured image data, a pixel located on the edge of the image capture object which has a rectangular shape. In order to prevent a background edge from being erroneously determined to be the edge of the image capture object, it is alternatively possible to employ a method in which it is determined that an edge of the image capture object is detected only in a case where an edge having a length of not less than a given length is detected. In this case, the given length can be set, for example, to a length which is approximately 80% of a length of an end side of an image in the captured image data. Alternatively, it is also possible to cause the user to select the edge of the image capture object from the edges thus detected. It is possible to employ, as such an edge detection method, a technique disclosed in Japanese Patent Application Publication, Tokukai, No. 2006-237757 A.

Figure 4:
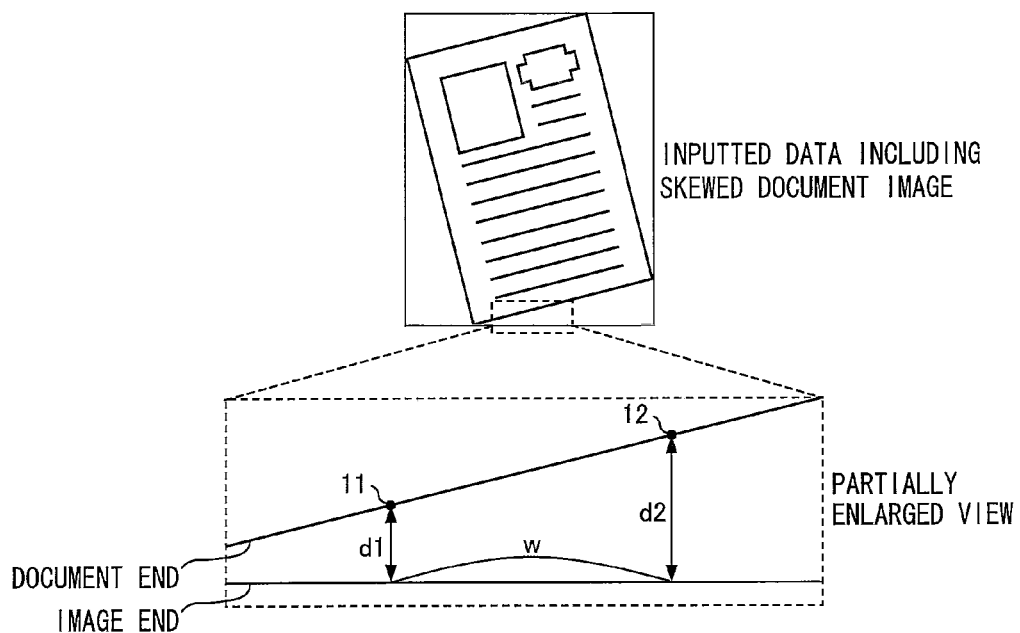
FIG. 4 illustrates an example of detection of a skew of an image which detection is carried out in the captured image processing method of the present invention.
Figure 6:
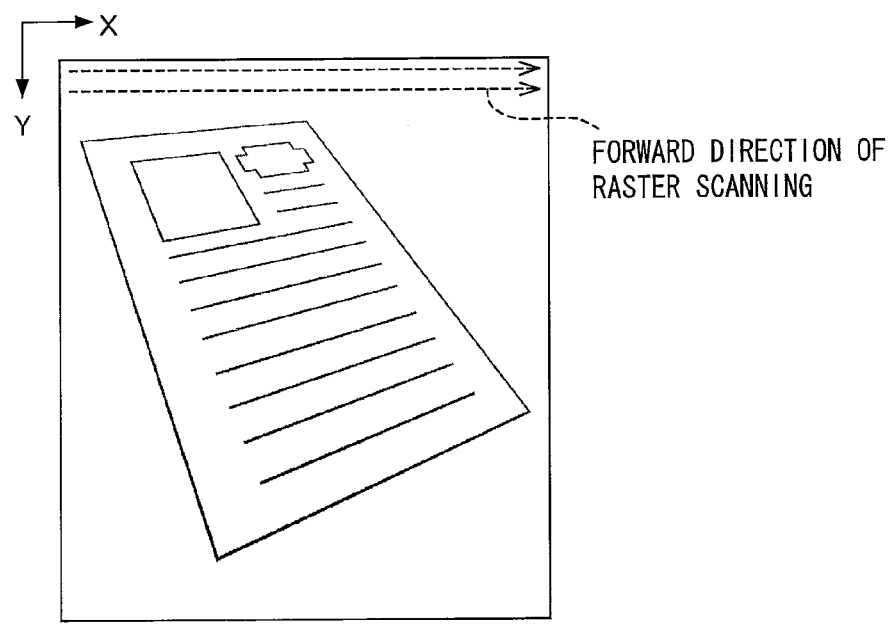
FIG. 6 illustrates an example of detection of a geometric distortion of an image.
Figure 7:
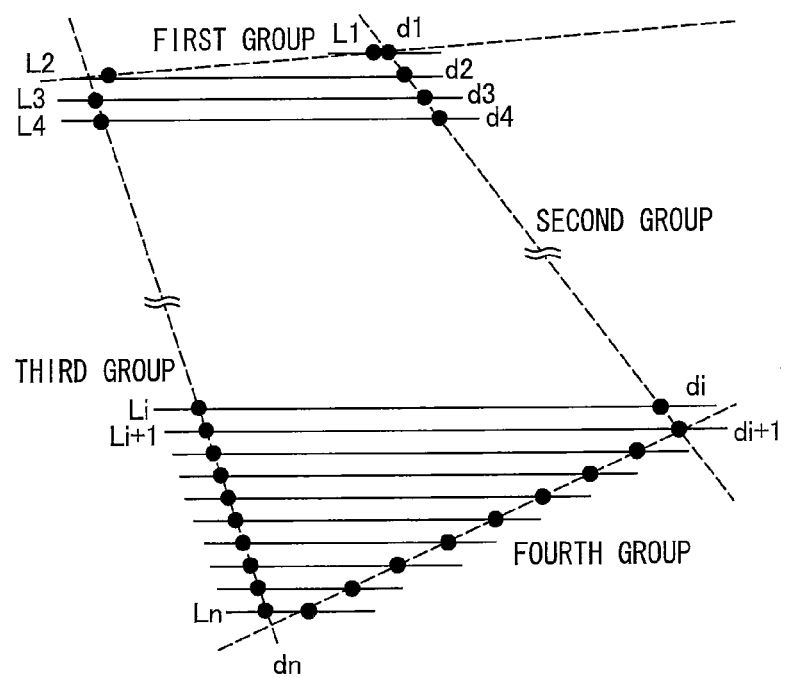
FIG. 7 illustrates an example of an edge detection process carried out with respect to an object in an image.

The captured image determination section 102 selects two points located on the detected edge of the image capture object. For example, the captured image determination section 102 selects two points 11 and 12 which are away from a center of the captured image data by w/2 in a transverse direction to the right and left, respectively (see FIG. 4). Next, it is possible to determine a skew of the image capture object in the captured image by determining shortest distances $d_1$ and $d_2$ between an end side of the captured image data and the respective selected two points 11 and 12. In the case of FIG. 4, when an angle of the skew is indicated as θ, $\tan θ = (d_2 - d_1)/w$. Then, the captured image determination section 102 calculates a value of $(d_2 - d_1)/w$ and reads out a corresponding angle θ, for example, from a table (refer to FIG. 5) which has been prepared in advance.

Subsequently, the captured image determination section 102 determines whether or not the detected angle θ falls within a given range (e.g., −30° to +30°) and supplies a determined result to the control section 109. Note here that it is one of the process execution requirements that the angle θ falls within the given range.

(3-2) Determination of Geometric Distortion

As described earlier, the geometric distortion means that in a case where image capture is obliquely carried out with respect to the image capture object from a direction different from the normal direction of the plane of the image capture object on which plane the text image is formed, the image capture object has, in the captured image, a distorted shape instead of the rectangular shape. For example, in a case where image capture is carried out with respect to the image capture object obliquely, i.e., from a left below direction with respect to a normal direction of the paper, the image capture object has a distorted quadrangular shape (see FIG. 6).

As described later, according to the present embodiment, the image output apparatus 200 has a function of correcting such a geometric distortion. Note, however, that in a case where the geometric distortion occurs to a large degree, readability will not be so enhanced even if the geometric distortion is corrected. In view of this, the captured image determination section 102 of the present embodiment detects features indicative of a degree of the geometric distortion so as to determine whether or not the features fall within a given range.

Edges of respective sides of the image capture object do not necessarily exist in the vicinity of a center of the angle of view. In view of this, according to the present embodiment, edges are extracted, at given regular intervals, from all sides, line segments identified by the respective edges are found, and intersections of these line segments are found, thereby defining a region where the image capture object is located.

First, the captured image determination section 102 carries out a raster scanning with respect to the captured image data. Note here that (i) a forward direction and (ii) a direction which is perpendicular to the forward direction are an X direction and a Y direction, respectively (see FIG. 6). Note also that an upper left corner is an origin in the captured image.

In a case where no edge is detected as a result of the scanning carried out with respect to one (1) line, the captured image determination section 102 carries out the scanning with respect to a subsequent line which is away from the one line by a predetermined distance in the Y direction. Note that an interval between the lines is not limited to a specific one, provided that it is a fixed one. Further, the line is not necessarily constituted by a single pixel.

Next, in the raster scanning, the captured image determination section 102 regards, as $L_1$ (a first line), a line on which an edge is firstly detected. The captured image determination section 102 classifies, into a first group, coordinates of a point determined to be the first edge in the forward direction, and then classifies, into a second group, coordinates of a point determined to be the second edge on the first line (see FIG. 7). The scanning is consecutively carried out with respect to a subsequent line so that an edge is detected. Then, with respect to each line Li, a difference in X-coordinate value between (a) a point firstly determined to be an edge of the image capture object in the forward direction and (b) a point secondly determined to be an edge of the image capture object in the forward direction (a distance $d_i$ between X-coordinates of the two points) is found, and then an edge determination is carried out as below.

It is assumed that the X-coordinate of the first edge on the line $L_i$ is $X_{i1}$ (the X-coordinate belonging to the first group) and the X-coordinate of the second edge on the line $L_i$ is $X_{i2}$ (the X-coordinate belonging to the second group). The features detection method is carried out as below.

(a) Coordinates $X_{11}$ and $X_{12}$ on the first line ($L_1$) are invariable.

(b) As for an ith line (i is an integer of not less than 2), an intercoordinate distance $d_{i1}$ ($=X_{i1}-X_{(i-1)1}$) and $d_{i2}$ ($=X_{i2}-X_{(i-1)2}$) are found. Note that the following description discusses $d_{i1}$, and so omits a suffix 1. Same applies to $d_{i2}$.

(c) As for an ith line (i is an integer of not less than 3), $dd_i$=abs $\{(d_i)-d_{i-1}\}$ is found. In a case where $dd_i \leq th_1$ ($\approx$ a small value close to 0 (zero)), a coordinate $X_i$ is classified into an identical group (the first group or the second group). Otherwise (in a case where $dd_i > th_1$), the coordinate $X_1$ is classified into a different group (a third group or a fourth group).

(d) Only in a case where i=4, a process for deciding a group of $X_2$ is carried out as an initial process. The process is carried out as below.

i) $dd_3 \leq th_1$ and $dd_4 \leq th_1 \rightarrow X_2$: identical group
 ii) $dd_3 > th_1$ and $dd_4 \leq th_1 \rightarrow X_2$: different group
 iii) $dd_3 \leq th_1$ and $dd_4 > th_1 \rightarrow X_2$: identical group
 iv) $dd_3 > th_1$ and $dd_4 > th_1 \rightarrow X_2$: identical group Once a transition of $X_2$ to the different group (the third group or the fourth group) occurs, it is unnecessary to check increase and decrease in $dd_i$.

Such a process is carried out with respect to an entire image so that edge points are extracted for each of the groups. Then, coordinates of the edge points which belong to each of the groups are subjected to linearization by use of a method such as a method of least squares or the like. This allows a straight line, which is approximate to the edge points which belong to each of the groups, to be found. The lines correspond to the sides of the image capture object.

Figure 8:
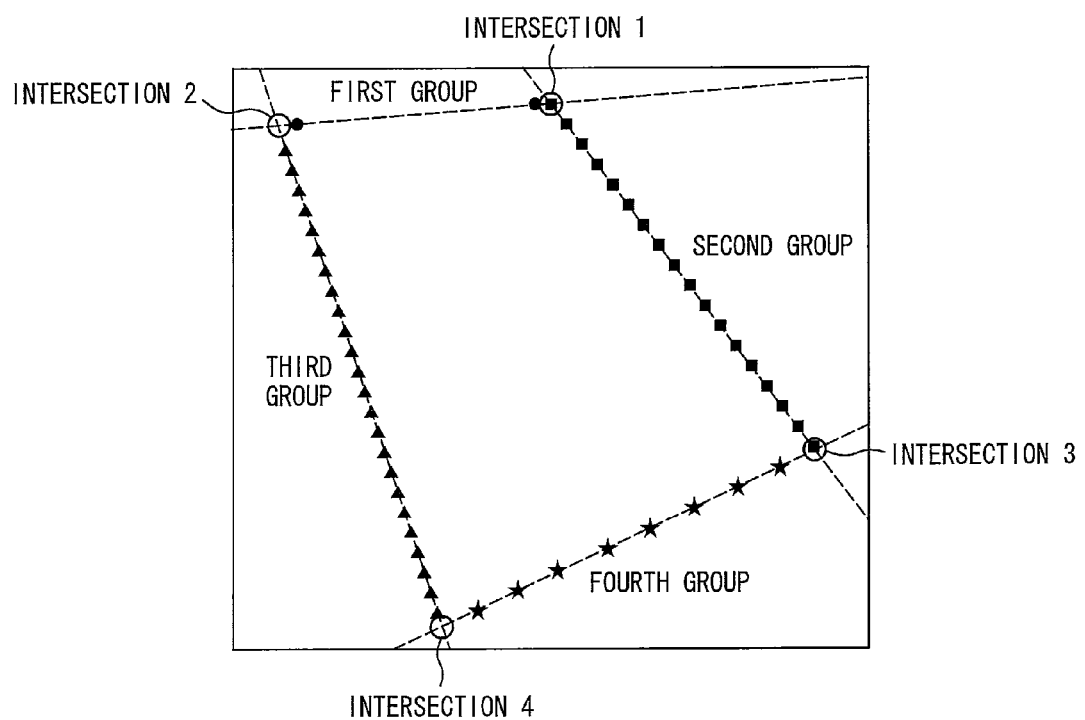
FIG. 8 illustrates an example of detection of an edge of an image in a raster direction.

FIG. 8 is a drawing illustrating a case where edge points are extracted by the raster scanning in accordance with a process as mentioned above and classified into the four groups. Note, in FIG. 8, that a circle indicates an edge which belongs to the first group, a quadrangle indicates an edge which belongs to the second group, a triangle indicates an edge which belongs to the third group, and a star indicates an edge which belongs to the fourth group. Note also in FIG. 8 that straight lines, which have been subjected to the linearization by use of the method of least squares so as to be approximate to the edge points for each of the groups, are illustrated by respective dotted lines.

Then, intersections (intersections 1 through 4 illustrated in FIG. 8) of the straight lines for the respective four groups are found. This makes it possible to define a region surrounded by the four straight lines as a region where the image capture object is located.

Further, a classifying process as mentioned above can be carried out with respect to an image which has been subjected to a 90-degree rotation. This also allows an extraction of edges of a document which is ideally provided so as to be parallel to a horizontal direction and a vertical direction of the image. Namely, the raster scanning allows a detection of an edge in the vertical direction in the image which has not been rotated. In contrast, the raster scanning allows a detection of an edge which was in the horizontal direction before the image was rotated (which is in the vertical direction after the image is rotated) in the image which has been rotated. This also allows an extraction of edges which are parallel to the vertical direction and the horizontal direction. As long as a sufficient amount of information is obtained (for example, not less than three intersections are obtained in each of the groups) before the rotation of the image, only this information can be used. In contrast, in a case where the number of intersections obtained is less than one in any one of the groups, it is obviously impossible to formulate a straight line. In such a case, intersections obtained after the rotation of the image can be used.

Alternatively, it is also possible to formulate a straight line by (i) carrying out again a coordinate conversion with respect only to found coordinates of an intersection, (ii) finding a corresponding group from regions in which the respective groups are distributed, and (iii) integrating information on the intersections. Namely, the straight line can be formulated by integrating coordinates of intersections, which belong to an identical group, out of (i) coordinates of intersections which coordinates are found by the image which has not been rotated and (ii) coordinates of intersections which coordinates are obtained by carrying out a coordinate conversion with respect to intersections found by the image which has been rotated.

Note that it is possible to extract an edge point in accordance with the following method. Pixel values, obtained in a small window which has a width of at least one pixel, are compared as they are (a sum or an averages of the pixel values are compared in a case where the width is not less than two pixels). In a case where pixel values of adjacent windows have a difference of not less than a given value, an edge point can be determined. In order to prevent a background edge or an edge of a text included in the image capture object from being erroneously determined to be the edge of the image capture object, it is alternatively possible to employ a method in which it is determined that an edge of the image capture object is detected only in a case where an edge having a length of not less than a given length is detected. In this case, the given length can be set, for example, to a length which is approximately 80% of a length of an end side of an image in the captured image data. Alternatively, it is also possible to cause the user to select the edge of the image capture object from the edges thus detected. It is possible to employ, as such an edge detection method, a technique disclosed in Japanese Patent Application Publication, Tokukai, No. 2006-237757 A. Alternatively, it is also possible to prevent such an erroneous detection by carrying out an evaluation of each of the coordinate groups or a process for detecting a line segment (e.g., a Hough transformation). Further, it is possible to prevent an edge of a text or a fine texture from being erroneously detected by carrying out a process employing a reduced image as preprocessing.

After finding the four straight lines and their intersections, the captured image determination section 102 finds each ratio between lengths of opposite sides of the quadrangle defined by the four straight lines. The each ratio between the lengths can be easily found by use of the coordinates of the intersections. Note that the quadrangle has two pairs of the opposite sides and thus the captured image determination section 102 finds a ratio between lengths for each of the two pairs.

Note here that the ratio between the lengths of the opposite sides is equal to 1 (one to one) in a case where image capture is carried out, from the front, with respect to the image capture object which has a rectangular shape, the image capture object included in the captured image also has a rectangular shape. In contrast, in a case where image capture is obliquely carried out with respect to the image capture object which has a rectangular shape, the ratio becomes a value different from 1. This is because the image capture object included in the captured image has a distorted quadrangular shape. As a direction in which image capture is carried out is at a greater angle to the normal direction of the plane of the image capture object on which plane the text image is formed, a difference between a value of the ratio and 1 increases. It follows that the ratio between the lengths of the opposite sides is one of the features indicative of a degree of the geometric distortion.

Then, the captured image determination section 102 determines whether or not each of the two ratios that has been found falls within a given range (e.g., 0.5 to 2) and supplies a determined result to the control section 109. Note here that the given range is set in advance so that a geometric distortion correction can be made by the image output apparatus 200, and is stored in the storage section 108. Note also that it is one of the process execution requirements that each of the two ratios falls within the given range (e.g., 0.5 to 2).

Note that the captured image determination section 102 can use, as alternative features indicative of the degree of the geometric distortion, an angle formed by two straight lines which are defined by two and the remaining two, respectively, of the four intersections which have been detected as above.

(4) Notification to User

In response to the determined result received from the captured image determination section 102, the control section 109 controls the display section 105 to display a message urging image capture to be carried out again.

For example, when receiving, from the captured image determination section 102, a determined result that an angle of the skew θ falls outside the given range, the control section 109 controls the display section 105 to display a message which urges image capture to be carried out again so that the image capture object is not skewed.

In response to a determined result that features indicative of a degree of the geometric distortion (here, a ratio between the lengths of the opposite sides of the image capture object in the captured image) falls outside the given range, the control section 109 controls the display section 105 to display a message which urges image capture to be carried out again from the normal direction of the plane of the image capture object on which plane the text image is formed.

(5) Arrangement of the Image Output Apparatus

An arrangement of the image output apparatus 200 is described below with reference to FIGS. 9 through 14. In the present embodiment, the image output apparatus 200 is a multifunction printer which has functions of a scanner, a printer, a copying machine, and the like.

Figure 9:
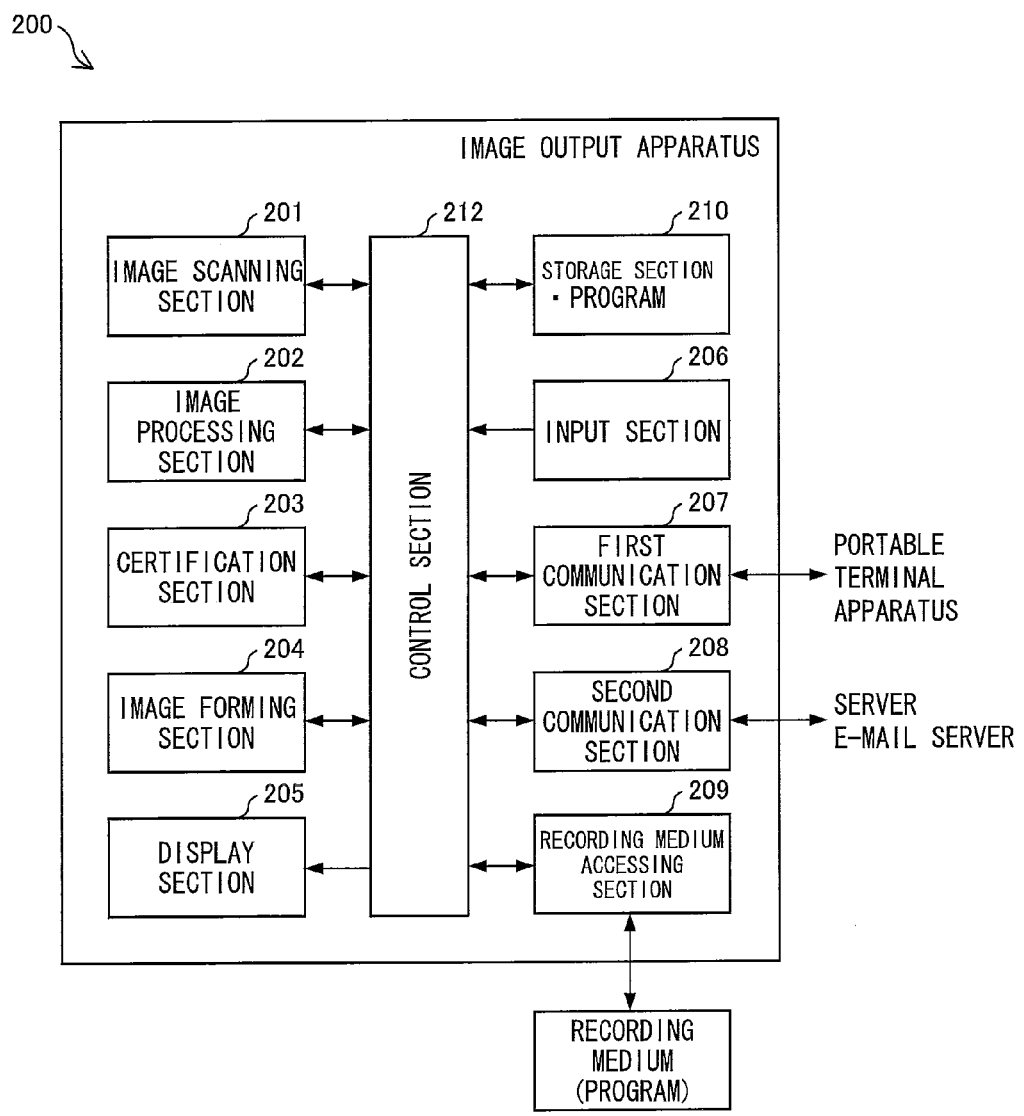
FIG. 9 is a block diagram illustrating an arrangement of the image output apparatus of the present invention.

FIG. 9 is a block diagram illustrating the arrangement of the image output apparatus 200. The image output apparatus 200 includes an image scanning section 201, an image processing section (a correction processing section) 202, a certifying section 203, an image forming section (output section) 204, a display section 205, an input section 206, a first communication section (receiving section) 207, a second communication section (an output section) 208, a recording medium accessing section 209, a storage section 210, and a control section (an output section) 212.

The image scanning section 201 scans a document and has a scanner section including a CCD (Charge Coupled Device) which converts light reflected from the document to an electric signal (an analogue image signal) which has been subjected to R, G, and B color separations. Then, the image scanning section 201 supplies this electric signal.

The image processing section 202 carries out given image processing with respect to image data. According to the present embodiment, the image processing section 202 carries out the image processing including the high resolution correction with respect to the captured image data transmitted from the portable terminal apparatus 100. The image processing carried out by the image processing section 202 with respect to the captured image data will be described later in detail.

The certifying section 203 carries out user certification when the output process is carried out with respect to the captured image data received from the portable terminal apparatus 100. In detail, the certifying section 203 carries out the user certification by comparing (a) the user information received from the portable terminal apparatus 100 with (b) the user information entered from the input section 206 (a user ID and a password). The certifying section 203 transmits a certified result to the control section 212.

The image forming section 204 forms an image on recording paper such as paper by use of an electrophotographic printing method, an ink-jet method, or the like. Namely, the image forming section 204 carries out the printing process which is one of the output processes.

The display section 205 is realized by a liquid crystal display device, for example. The input section 206 is provided for entering data by, for example, touching a touch panel or a button included in the liquid crystal display device.

The first communication section 207 has functions of the serial/parallel transfer and the wireless data communication which are carried out in conformity with the USB 1.1 or USB 2.0 Standard. The first communication section 207 receives, from the portable terminal apparatus 100, the captured image data to which the file name, the information on the model of the portable terminal apparatus 100, the user information, and the output process information are added.

The second communication section 208 has the following functions (a) through (c): (a) data communication employing a wireless technology which is in conformity with any one of LAN standards IEEE 802.11a, IEEE 802.11b, and IEEE 802.11g, (b) data communication with a network, via a LAN cable, having a communications interface function employing Ethernet (registered trademark), and (c) data communication employing a wireless technology which is in conformity with any one of communication systems such as IEEE 802.15.1 (so-called Bluetooth (registered trademark) which is the wireless communication standard, the infrared communication standard such as IrSimple, and Felica (registered trademark).

The second communication section 208 carries out, as the output process, (i) the filing process for causing the captured image data which has been subjected to the high resolution correction to be stored in the server or (ii) the e-mail transmission process for transmitting the e-mail to which the captured image data which has been subjected to the high resolution correction is attached.

The recording medium accessing section 209 reads out a program from a recording medium in which the program is recorded. The storage section 210 serves as a section in which a program for causing the sections of the image output apparatus 200 to carry out their respective processes is stored.

The control section 212 carries out control with respect to the sections included in the image output apparatus 200. In detail, when the first communication section 207 receives a single piece of captured image data from the portable terminal apparatus 100, the control section 212 supplies the single piece of captured image data to the image processing section 202 so as to control the image processing section 202 to carry out the image processing. In addition, the control section 212 supplies, to the certifying section 203, the user information added to the image data so as to control the certifying section 203 to carry out a certification process. When receiving a certified result that the certification has been successfully carried out, the control section 212 controls the corresponding process to be carried out in accordance with the output process information added to the captured image data. Namely, in a case where the output process information is indicative of the printing process, the control section 212 controls the image forming section 204 to carry out the printing in accordance with the captured image data which has been subjected to the image processing by the image processing section 202. Alternatively, in a case where the output process information is indicative of the filing process or the e-mail transmission process, the control section 212 controls the second communication section 208 to carry out the filing process or the e-mail transmission process in accordance with the captured image data which has been subjected to the image processing by the image processing section 202.

(6) Image Processing Carried Out by the Image Processing Section

The image processing carried out by the image processing section 202 is described below in detail. Note that the description below discusses details of the image processing carried out with respect to the single piece of captured image data received from the portable terminal apparatus 100, though the image processing section 202 also carries out the image processing with respect to the image data scanned by the image scanning section 201.

According to the present embodiment, the image processing section 202 carries out the geometric distortion correction, the lens distortion correction, and the high resolution correction, with respect to the single piece of captured image data transmitted from the portable terminal apparatus 100. Processes carried out in the respective corrections are described below.

(6-1) Geometric Distortion Correction and Lens Distortion Correction

Like the captured image determination section 102, the image processing section 202 sequentially detects, by the raster scanning, points on an edge of the image capture object in the captured image. Then, the image processing section 202 carries out a curvilineal approximation with respect to the points detected on the edge, and carries out the lens distortion correction based on a curve fitting.

Figure 10:
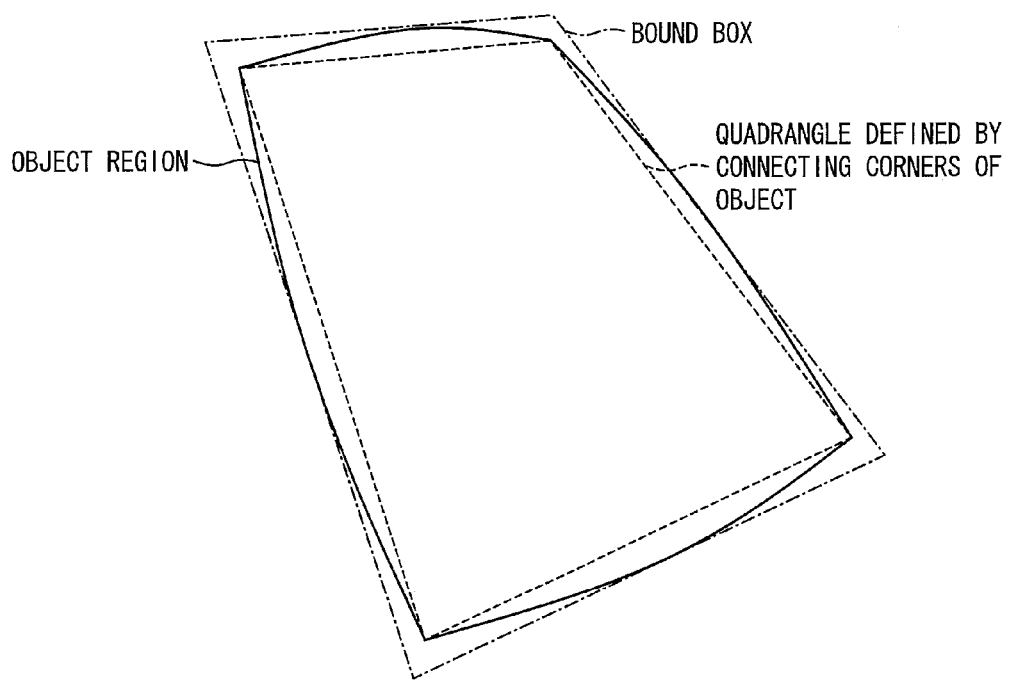
FIG. 10 illustrates an example of a correction for a lens distortion of an image.
Figure 11:
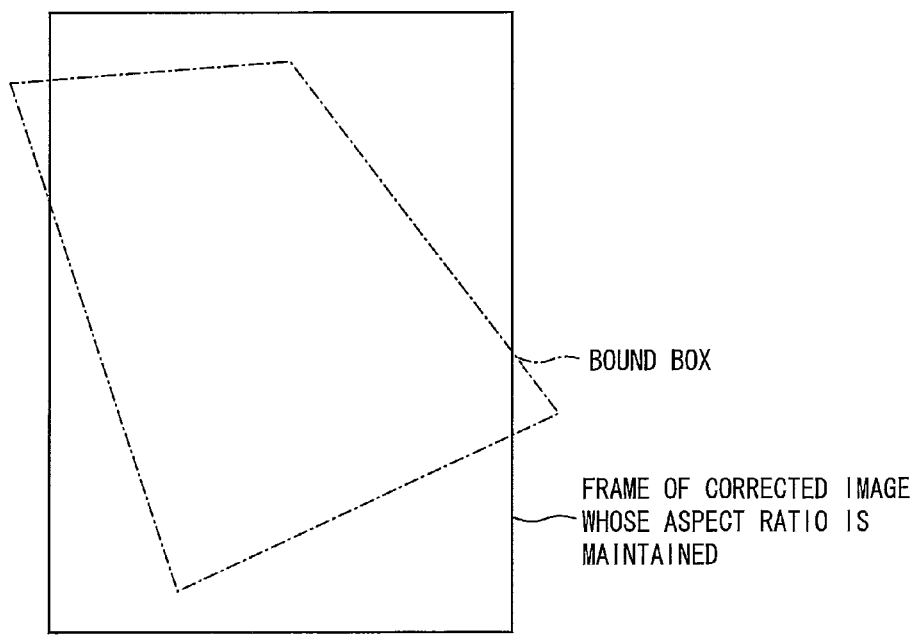
FIG. 11 illustrates an example of a correction for the geometric distortion of an image.

In detail, the image processing section 202 detects the edge points of the detected image capture object and classifies, like the captured image determination section 102, the edge points into four groups which correspond to four sides of the image capture object (see solid lines in FIG. 10). Subsequently, the image processing section 202 carries out a quadratic curve approximation with respect to the edge points which belong to each of the four groups. Four quadratic curves thus determined with respect to the respective four groups correspond to the respective four sides of the image capture object. In addition, the image processing section 202 finds four intersections of the four quadratic curves which intersections correspond to corner sections of a region defined by the four quadratic curves. Next, the image processing section 202 finds a bound box (see one-dot chain lines in FIG. 10) in which the four quadratic curves found for the respective four sides are circumscribed, and which is similar to a quadrangle (see dotted lines in FIG. 10) defined by connecting the four intersections. Then, the image processing section 202 carries out a transformation with respect to the location of pixels in a region where the image capture object is located in the captured image so that the edge pixels of the image capture object which has been corrected are located on the sides of the bound box. Such a transformation can be carried out by carrying out calculations in accordance with vectors from a reference point (e.g., the centroid of the region where the image capture object is located). This allows the lens distortion, due to the image capture section 101 of the portable terminal apparatus 100, to be corrected.

Further, the image processing section 202 carries out the geometric distortion correction as below. The image processing section 202 can carry out a similar mapping transformation with respect to the bound box, which has been found as described above, in accordance with an aspect ratio (e.g., 7:10 in the case of A-/B-size used when outputting a business document) of the image capture object. A publicly-known technique can be used as the mapping transformation (see FIG. 11). Note that the image processing section 202 can carry out the mapping transformation in accordance with an aspect ratio stored in the storage section 210 or an aspect ratio entered from the input section 206.

Note that methods for correcting the geometric distortion and the lens distortion are not limited to the above methods and that publicly-known techniques can be employed for the correction.

(6-2) High Resolution Correction by Use of Image Data

As described earlier, the image output apparatus 200 receives, from the portable terminal apparatus 100, a single piece of captured image data. Then, the image output apparatus 200 carries out the high resolution correction in accordance with the single piece of the captured image data.

As for a method for forming a high resolution image in accordance with a single piece of image data, several methods are disclosed in the Journal of the Institute of Image Information and Television Engineers Vol. 62, No. 2, pp. 181 through 189 (published in 2008).

Generally, it is possible to carry out the high resolution correction by (i) detecting a direction of an edge of an image pattern so as to carry out an interpolation in accordance with the direction of the edge and (ii) carrying out a de-noising process so as to remove at least (a) a distortion due to the interpolation and (b) an influence of a noise component existing in an inputted image. This is described below in detail.

FIG. 12 is a flow chart illustrating a processing flow of the high resolution correction carried out in the present embodiment.

Note that an example of a resolution conversion carried out at a magnification of ×2 in each of transverse and longitudinal directions is described here. In a case where (i) the resolution conversion is carried out at the magnification of ×2 and (ii) the number of pixels included in the captured image data which is to be subjected to the high resolution correction is n×m, the number of pixels included in the captured image data which has been subjected to the high resolution correction is 2n×2m. Such a high resolution correction (the resolution conversion carried out at the magnification of ×2) is carried out by preparing, as high resolution image data, image data including both reference pixels and interpolated pixels. The reference pixels are the respective pixels included in the captured image data and the interpolated pixels are newly prepared in the middle of the respective reference pixels. FIG. 13 shows a relationship between a reference pixel and an interpolated pixel. In FIG. 13, a pixel a and a pixel b indicate the reference pixel and the interpolated pixel, respectively.

First, the image processing section 202 carries out an edge extraction with respect to the captured image data received by the first communication section 207. For example, the image processing section 202 carries out the edge extraction by use of a first order differential filter as shown in FIG. 15. Then, the image processing section 202 carries out a binarization process so as to prepare binary image data (S1). Note that a pixel which has a pixel value of 1 in the binary image data shows that the pixel is highly likely to be an edge.

Next, the image processing section 202 determines, in accordance with the binary image data prepared in S1, whether or not a target pixel included in the captured image data is an edge (S2). Specifically, the image processing section 202 determines that the target pixel is an edge when a pixel, which corresponds to the target pixel in the binary image data, has a pixel value of 1.

Note that the target pixel intends a pixel which is currently targeted in a case where the pixels in the captured image data are targeted in any order.

In a case where the target pixel is an edge (Yes in S2), the image processing section 202 detects an edge direction by use of a partial image corresponding to (N×N) pixels (N>1) which includes the target pixel (S3). In detail, the image processing section 202 determines whether or not each of the reference pixels in the partial image corresponding to (N×N) pixels is an edge pixel. Then, in a case where a reference pixel on the upper left of the target pixel and a reference pixel on the lower right of the target pixel are respective edge pixels, the image processing section 202 determines that the edge direction of the partial image is an upper left-lower right direction. Similarly, in a case where a reference pixel on the left of the target pixel and a reference pixel on the right of the target pixel are respective edge pixels, the image processing section 202 determines that the edge direction is a left-right direction. In a case where a reference pixel on the upper side of the target pixel and a reference pixel on the lower side of the target pixel are respective edge pixels, the image processing section 202 determines that the edge direction of the partial image is an upper-lower direction. In a case where a reference pixel on the upper right of the target pixel and a reference pixel on the lower left of the target pixel are respective edge pixels, the image processing section 202 determines that the edge direction of the partial image is an upper right-lower left direction.

In FIG. 14, a dotted line indicates a detected edge direction. Note, in FIG. 14, that pixels (1) through (9) are respective reference pixels and the pixel (5) is a target pixel. Note also that pixels A, B, and C are (i) an interpolated pixel between the reference pixels (1) and (5), (ii) an interpolated pixel between the reference pixels (2) and (5), and (iii) an interpolated pixel between the reference pixels (4) and (5), respectively.

Next, the image processing section 202 finds, in accordance with the edge direction detected in S3, pixel values of the respective interpolated pixels A, B, and C which are located (i) on the upper left, (ii) on the upper side, and (iii) on the left, respectively, of the target pixel. Note here that the pixel values of the respective interpolated pixels are found by use of the reference pixels located in the edge direction.

In a case where the edge direction is the upper left-lower right direction, the reference pixels (1), (5), and (9) are respective edge pixels and a straight line connecting these pixels serves as an edge line (see FIG. 14($a$)). Then, a pixel value VA (Note that a written expression of "V" is omitted in FIG. 14 and this is applied to the other pixel values.) of the interpolated pixel A located on the edge line is found based on the equation of VA=(V(1)+V(5))/2, by use of pixel values (a pixel value V(1) and a pixel value V(5)) of the reference pixel (1) and the reference pixel (5), respectively, each being adjacent to the interpolated pixel A located on the edge line.

In contrast, with respect to each of the interpolated pixels B and C located on no edge line, the interpolation is carried out by use of the reference pixels located on straight lines which (i) include the reference pixels which are different from those located on the edge line and the closest to the respective interpolated pixels B and C (hereinafter such a reference pixel is referred to as a closest reference pixel) and (ii) are parallel to the edge direction. For example, as for the interpolated pixel B, the straight line which (i) includes the reference pixel (2) which is the closest reference pixel and (ii) is parallel to the edge line is a straight line connecting the reference pixels (2) and (6) (see FIG. 14($a$)). Then, a point, which is perpendicularly drawn from the interpolated pixel B to the straight line, causes a line segment defined by the reference pixels (2) and (6) to be internally divided. Therefore, a pixel value VB of the interpolated pixel B is found by use of the following equation: VB=(9×V(2)+4×V(6))/13.

Similarly, a pixel value VC of the interpolated pixel C is found based on the equation of VC=(9×V(4)+4×V(8))/13, by use of (i) a pixel value of the reference pixel (4) which is the closest reference pixel value and (ii) a pixel value of the reference pixel (8) which is located on a straight line which includes the reference pixel (4) and is parallel to the edge direction.

In a case where the edge direction is the left-right direction, the reference pixels (4), (5), and (6) are edge pixels and a straight line connecting these pixels serves as the edge line (see FIG. 14($b$)). Then, the pixel value VC of the interpolated pixel C located on the edge line is found based on the equation of VC=(V(4)+V(5))/2, by use of the pixel values (pixel values V(4) and V(5)) of the reference pixel (4) and the reference pixel (5), respectively, each being adjacent to the interpolated pixel C located on the edge line.

In contrast, with respect to each of the interpolated pixels A and B located on no edge line, the interpolation is carried out by use of the reference pixels located on straight lines which (i) include the reference pixels which are different from those located on the edge line and the closest to the respective interpolated pixels A and B (the closest reference pixels) and (ii) are parallel to the edge direction. For example, as for the interpolated pixel A, the straight line which (i) includes the reference pixel (1) or the reference pixel (2) which is the closest reference pixel and (ii) is parallel to the edge line is a straight line connecting the reference pixels (1) and (2) (see FIG. 14($b$)). Then, a point, which is perpendicularly drawn from the interpolated pixel A to the straight line, exists in the middle of the reference pixels (1) and (2). Therefore, the pixel value VA of the interpolated pixel A is found by use of the following equation: VA=(V(1)+V(2))/2.

As for the interpolated pixel B, the straight line which (i) includes the reference pixel (2) which is the closest reference pixel and (ii) is parallel to the edge line is a straight line connecting the reference pixels (1), (2), and (3). Then, a point, which is perpendicularly drawn from the interpolated pixel B to the straight line, coincides with the reference pixel (2). Therefore, the interpolated pixel B is set to have the pixel value VB which is identical to the pixel value V(2) of the reference pixel (2).

In a case where the edge direction is the upper right-lower left direction, the reference pixels (3), (5), and (7) are edge pixels and a straight line connecting these pixels serves as the edge line (see FIG. 14($c$)). Then, none of the interpolated pixels A, B, and C exists on the edge line.

As for the interpolated pixel A, the reference pixels (1), (2), and (4) are the closest reference pixels. Note here that the reference pixels (2) and (4) are located on a single straight line which is parallel to the edge direction, whereas the reference pixel (1) is not located on the single straight line. In view of this, the pixel value VA of the interpolated pixel A is found based on the equation of VA=(V(1)+V(2))+V(4)/3, by use of the pixel values of the respective reference pixels (1), (2), and (4) which are the closest reference pixels.

In contrast, with respect to each of the interpolated pixels B and C, the interpolation is carried out by use of the reference pixels located on straight lines which (i) include the reference pixels which are different from those located on the edge line and the closest to the respective interpolated pixels B and C (the closest reference pixels) and (ii) are parallel to the edge direction. For example, as for the interpolated pixel B, the straight line which (i) includes the reference pixel (2) which is the closest reference pixel and (ii) is parallel to the edge line is a straight line connecting the reference pixels (2) and (4) (see FIG. 14(c)). Then, a point, which is perpendicularly drawn from the interpolated pixel B to the straight line, causes a line segment defined by the reference pixels (2) and (4) to be internally divided. Therefore, the pixel value VB of the interpolated pixel B is found by use of the following equation: VB=(9×V(2)+4×V(4))/13.

Similarly, the pixel value VC of the interpolated pixel C is found based on the equation of VC=(4×V(2)+9×V(4))/13, by use of (i) the pixel value of the reference pixel (4) which is the closest reference pixel value and (ii) the pixel value of the reference pixel (2) which is located on the straight line which includes the reference pixel (4) and is parallel to the edge direction.

In a case where the edge direction is the upper-lower direction, the reference pixels (2), (5), and (8) are edge pixels and a straight line connecting these pixels serves as the edge line (see FIG. 14(d)). Then, the pixel value VB of the interpolated pixel B located on the edge line is found based on the equation of VC=(V(2)+V(5))/2, by use of the pixel values of the respective reference pixels (2) and (5) each being adjacent to the interpolated pixel B located on the edge line.

In contrast, with respect to each of the interpolated pixels A and C located on no edge line, the interpolation is carried out by use of the reference pixels located on straight lines which (i) include the reference pixels which are different from those located on the edge line and the closest to the respective interpolated pixels A and C (the closest reference pixels) and (ii) are parallel to the edge direction. For example, as for the interpolated pixel A, the straight line which (i) includes the reference pixel (1) or the reference pixel (4) which is the closest reference pixel and (ii) is parallel to the edge line is a straight line connecting the reference pixels (1) and (4) (see FIG. 14(d)). Then, a point, which is perpendicularly drawn from the interpolated pixel A to the straight line, exists in the middle of the reference pixels (1) and (4). Therefore, the pixel value VA of the interpolated pixel A is found by use of the following equation: VA=(V(1)+V(4))/2.

As for the interpolated pixel C, the straight line which (i) includes the reference pixel (4) which is the closest reference pixel and (ii) is parallel to the edge line is a straight line connecting the reference pixels (1), (4), and (7). Then, a point, which is perpendicularly drawn from the interpolated pixel C to the straight line, coincides with the reference pixel (4). Therefore, the interpolated pixel C is set to have the pixel value VC which is identical to the pixel value V(4) of the reference pixel (4).

Note that information, in which (i) an edge direction and (ii) equations for finding the pixel values of the respective interpolated pixels A, B, and C are associated with each other, is preliminarily stored in the storage section 210. The image processing section 202 reads out, from the storage section 210, the equations associated with the edge direction detected in S3, and then can find the pixel values of the respective interpolated pixels A, B, and C in accordance with the equations thus read out.

Note that FIG. 14 illustrates only a case where the edges linearly extend. Note, however, that the edges can extend in a curved manner in the partial image corresponding to (N×N) pixels. Examples of the case include a case where the edge extends along the reference pixels (2)-(5)-(4) and a case where the edge extends along the reference pixels (1)-(5)-(7). Even in each of such cases, information, in which (i) edge directions and (ii) equations for finding pixel values of respective interpolated pixels A, B, and C are associated with each other, is preliminarily stored. For example, in the case where the edge extends along the reference pixels (2)-(5)-(4), equations similar to those in the cases of FIGS. 14(c), 14(b), and 14(d) are stored with respect to the interpolated pixels A, B, and C, respectively. Similarly, in the case where the edge extends along the reference pixels (1)-(5)-(7), equations similar to those in the cases of FIGS. 14(a), 14(a), and 14(d) are stored with respect to the interpolated pixels A, B, and C, respectively. Also in a case where the edge extends differently from the above, the foregoing information is similarly stored.

As described above, the image processing section 202 finds the pixel values of the respective interpolated pixels located in the vicinities of the respective reference pixels which have been determined to be the edge pixels.

In contrast, in a case where the target pixel is not an edge (No in S2), the image processing section 202 finds, by a general interpolation finding method (e.g., a bilinear interpolation method or a bicubic interpolation method), the pixel values of the respective interpolated pixels A, B, and C which are located (i) on the upper left side, (ii) on the upper side, and (iii) on the left side, respectively, of the target pixel so as to be adjacent to the target pixel (S4).

The image processing section 202 carries out the processes S2 through S4 with respect to all the reference pixels included in the captured image data. This causes interpolated image data including both the reference pixels and the interpolated pixels to be prepared.

Thereafter, the image processing section 202 carries out an image quality enhancement process with respect to the interpolated image data thus prepared. For example, the interpolated image data is subjected, by the image processing section 202, to a de-noising filter, a sharpening filter, and the like so that high resolution image data is prepared. Examples of the sharpening filter include a conventional unsharp mask and a filter in which a coefficient at the center of FIG. 15 is set to five (5). Note that a median filter is widely known as the de-noising filter. As for a more sophisticated method for the image quality enhancement, a Bilateral filter [Proceedings of the 1998 IEEE International Conference on Computer Vision] or the like can be used as a method having both an edge preserving property and an image quality enhancing property.

Note that a method for preparing high resolution image data is not limited to the methods described above and the image processing section 202 can prepare the high resolution image data in accordance with a single piece of captured image data by use of a variety of methods as disclosed in the Journal of the Institute of Image Information and Television Engineers Vol. 62, No. 2, pp. 181 through 189 (published in 2008).

(7) Image Processing Method Carried Out in the Captured Image Processing System

A flow of processes carried out in the captured image processing system is described below with reference to FIG. 1. Note that (a) of FIG. 1 illustrates a processing flow in the portable terminal apparatus 100, and (b) of FIG. 1 illustrates a processing flow in the image output apparatus 200.

First, the portable terminal apparatus 100 receives a selection of an image capture mode. Here, the user selects the text image capture mode in a case where the user (i) carries out image capture with respect to a rectangular image capture object shape such as paper on which a text image is printed or a display screen on which the text image is displayed and (ii) wishes the image output apparatus 200 to output a captured image which has been subjected to the high resolution correction.

In the portable terminal apparatus 100 which has received the selection of the text image capture mode, the control section 109 controls the display section 105 to display a window which urges the user to enter, from the input section 106, (i) a kind of an output process and (ii) a setting requirement for carrying out the output process. This allows the control section 109 to obtain output process information entered from the input section 106.

When detecting a shutter click, the image capture section 101 consecutively carries out image capture only one time (S10).

Next, the image processing section 103 carries out at least the A/D conversion process with respect to data of the captured image (captured image data). Then, the captured image determination section 102 determines whether or not the captured image data which has been subjected to the A/D conversion process meets the process execution requirements (S11). Note that details of how to determine on the process execution requirements and items to be determined are as described earlier, for example, in (3-1) and (3-2).

In a case where the captured image determination section 102 determines that no process execution requirements are met (NO in S11), the control section 109 controls the display section 105 to display a message urging image capture to be carried out again, so that the user is notified of the message (S12). In a case where even an image which has been captured again meets no determination items as mentioned above, the portable terminal apparatus 100 repeatedly carries out steps S10 through S12.

In contrast, in a case where the captured image determination section 102 determines that the process execution requirements are met (YES in S11), the control section 109 assigns file names to the captured image data which meet the process execution requirements (S13). Note that the control section 109 can automatically assign, to the captured image data, (a) different file names (e.g., serial numbers which vary in accordance with image capture date and time) or (b) file names entered from the input section 106. Thereafter, the control section 109 transfers to the communication section 104 the image data, to which the file names are assigned, together with (i) the information on the model of the portable terminal apparatus 100 and the user information which are stored in the storage section 108 and (ii) the output process information. Then, the communication section 104 transmits these pieces of information to the image output apparatus 200 (S14).

Note that the control section 109 temporarily can save, in the storage section 108 or a memory card, the image data to which the file names are assigned, and then transfer the image data to the communication section 104 and to the image output apparatus 200, together with the information on the model of the portable terminal apparatus 100, the user information, and the output process information.

Next, the first communication section 207 of the image output apparatus 200 receives, from the portable terminal apparatus 100, the captured image data, the information on the model of the portable terminal apparatus 100, the user information, and the output process information (S20). After receiving the pieces of information and data, the image processing section 202 carries out the geometric distortion correction and the lens distortion correction (S21) (see the description of (6-1), for example). Further, the image processing section 202 carries out the high resolution correction in accordance with the captured image data (S22) (see the description of (6-2), for example). Thereafter, the control section 212 controls the storage section 210 to store the captured image data processed by the image processing section 202 (S23).

Subsequently, the control section 212 determines whether or not an output instruction to output the captured image data is entered from the input section 206 (S24). In a case where no output instruction is entered (NO in S24), the control section 212 waits for the output instruction to be entered.

In contrast, in a case where the output instruction is entered (YES in S24), the certifying section 203 controls the display section 205 to display a window urging user information (such as a user ID or a password) to be entered from the input section 206. This allows the user information to be entered from the input section 206. Then, the certifying section 203 carries out user certification (S25). Note that the certifying section 203 can alternatively obtain the user information from a non-contact IC card possessed by the user with the use of a non-contact IC card reader/writer included in the image output apparatus 200.

During the user certification, the certifying section 203 (i) compares the user information entered from the input section 206 with the user information received from the portable terminal apparatus 100 and (ii) determines whether or not these pieces of information match each other (S26). In a case where the image output apparatus 200 receives, from the portable terminal apparatus 100, the user information which matches the user information entered from the input section 206 (YES in S26), the control section 212 controls the output process to be carried out in accordance with the output process information received from the portable terminal apparatus 100 (S27). For example, in a case where the output process information is indicative of the printing process, the control section 212 supplies, to the image forming section 204, an instruction to carry out the printing process. Thereafter, the processing flow is ended.

In contrast, the user information entered from the input section 206 does not match the user information received from the portable terminal apparatus 100 (NO in S26), the certifying section 203 determines whether or not the certification is carried out not less than a given times (S28). In a case where the certification is carried out less than the given times (NO in S28), S25 and S26 processes are repeated. In a case where the certification is carried out not less than the given times (YES in S28), the processing flow is ended with no output.

As described above, according to the present embodiment, it is possible to cause the image output apparatus 200 to output the captured image captured by the portable terminal apparatus 100 in a state where the captured image has been subjected to the high resolution correction. This allows an improvement in text readability. Therefore, even in a case where it is difficult to bring writing paper to the image output apparatus 200, it is possible to obtain an image on the writing paper with high resolution by carrying out image capture with respect to the writing paper. Even in a case of a screen on which an image is displayed by a projector or the like, it is possible to later obtain a high resolution image from the image output apparatus 200, by causing the portable terminal apparatus 100 to carry out image capture with respect to the screen.

(8) Modifications

The captured image processing system of the present invention is not limited to the description of the embodiment above, but can be variously modified. An example of a modified embodiment is described below.

(8-1) Items Determined by the Captured Image Determination Section

According to the above description, the captured image determination section 102 determines (i) the skew and (ii) the geometric distortion of the image capture object in the captured image, when the text image capture mode is selected. However, items which the captured image determination section 102 determines are not limited to the items (i) through (iii). Examples of modified items to be determined are described below.

(a) For example, the user may wish the image output apparatus 200 to output a captured image of not only the image capture object such as paper on which a text image is printed or a display screen on which the text image is displayed but also scenery or a figure which captured image has been subjected to the high resolution correction. In view of this, the portable terminal apparatus 100 can have, instead of or separately from the text image capture mode, a high resolution output mode in which the image output apparatus 200 outputs the captured image that has been subjected to the high resolution correction. In a case the high resolution output mode is provided separately from the text image capture mode, the portable terminal apparatus 100 can supply the captured image data to which information indicative of a selected mode is added. This allows the image output apparatus 200 to carry out its output process in accordance with a selected mode.

In a case where the high resolution output mode is selected, the control section 109 of the portable terminal apparatus 100 can carry out control so that the captured image data which the image capture section 101 has captured is transmitted to the image output apparatus 200, without causing the captured image determination section 102 to carry out the determination processes. Similarly, in the image output apparatus 200 which is notified that the high resolution output mode is selected, the image processing section 202 carries out the high resolution correction (see the description of (6-2)) but does not carry out the geometric distortion correction and the lens distortion correction (see the description of (6-1)). This also brings about an effect of obtaining a higher resolution image than an actually captured image.

(b) Other items can be determined in addition to the above item. Examples of the other items include a brightness, a contrast, a color balance, and a blur (an intense camera shake).

As for a brightness, for example, in a case where overexposure occurs (the captured image is too bright) or underexposure occurs (the captured image is too dark), image capture may be required to be carried out again. In view of this, the captured image determination section 102 finds, for example, maximum and minimum ones of pixel values obtained in the captured image data. In a case where the maximum value is not more than a given threshold (e.g., 100 in case of 8 bits), the captured image determination section 102 determines that underexposure occurs, and then supplies, to the control section 109, a determined result. In contrast, in a case where the minimum value is not less than a given threshold (e.g., 150 in case of 8 bits), the captured image determination section 102 determines that overexposure occurs, and then supplies, to the control section 109, a determined result. Then, in response to the determined result that underexposure or overexposure occurs, the control section 109 controls the display section 105 to display the determined result and an instruction urging image capture to be carried out again. Alternatively, the control section 109 changes the setting of the image capture section 101 so that the image capture section 101 has longer exposure time in the case of underexposure. In contrast, the control section 109 changes the setting of the image capture section 101 so that the image capture section 101 has shorter exposure time in the case of overexposure. Thereafter, the control section 109 can notify the user of the instruction urging image capture to be carried out again.

As for a contrast, in a case where a difference between the maximum and minimum values of the pixel values obtained in the captured image data is not more than a given threshold, the captured image determination section 102 determines that the captured image has a poor contrast. Then, in response to a determined result that the captured image has a poor contrast, the control section 109 controls the display section 105 to display the determined result and an instruction urging image capture to be carried out again.

Note that the captured image determination section 102 can carry out the determination of a brightness and a contrast with respect to each of color channels or can use an average value (R+G+B/3) or a brightness value (0.299×R+0.587×G+0.114×B: conforming to NTSC).

As for a color balance, it is possible to detect an occurrence of an excessive imbalance in a given color channel by comparing average values of or maximum/minimum values of the respective color channels (R, G, and B). In view of this, the captured image determination section 102 determines that the captured image has a poor color balance, for example, in a case where (i) average values (Ra, Ga, and Ba) of the pixel values of the respective color channels which pixel values are obtained in the captured image data and have values in the vicinity of a maximum brightness value (in a range of maximum brightness to (maximum brightness—5)) are found, and (ii) a difference between the maximum value and the minimum value of average values (Ra, Ga, and Ba) of the respective color channels is not less than a corresponding given value [Max (Ra, Ga, and Ba)–Min (Ra, Ga, and Ba)>0.1× Max (Ra, Ga, and Ba)]. Then, in response to the determined result that the captured image has a poor color balance, the control section 109 causes the display section 105 to display the determined result and an instruction urging image capture to be carried out again.

As for a blur (an intense camera shake: a so-called motion blur), an edge of the captured image is less acute when the blur occurs. In view of this, the captured image determination section 102 prepares an edge intensity image by use of the edge extraction filter (see FIG. 9), and prepares a histogram so as to find a standard deviation of the histogram (a square root of the variance). In a case where the standard deviation is not more than a given threshold (e.g., 5), the captured image determination section 102 determines that a blur occurs in the captured image. Then, in response to a determined result of the determination that a blur occurs in the captured image, the control section 109 causes the display section 105 to display the determined result and an instruction urging image capture to be carried out again.

(8-2) Processing Items in the Image Output Apparatus

The above description discusses the case where the image processing section 202 of the image output apparatus 200 carries out the geometric distortion correction, the lens distortion correction, and the high resolution correction with respect to the captured image data received from the portable terminal apparatus 100. However, the processing carried out by the image processing section 202 is not limited to the above three corrections. The image processing section 202 can further carry out corrections such as a color balance correction and a contrast correction, in addition to the above three corrections.

A color balance can be corrected in accordance with a method in which the image processing section 202 finds maximum and minimum values of the received captured image data for each of the color channels, prepares look-up tables which cause the color channels to have uniform maximum and minimum values, and apply the look-up tables to the respective color channels. FIG. 16 shows an example of the look-up tables. As shown in FIG. 16, in a case where (i) a given channel has a maximum value of MX and a minimum value of MN and (ii) the data has 8 bits, a look-up table can be prepared that causes an increase from MN in increments of (MX−MN)/255.

The image processing section 202 carries out the contrast correction in a similar manner to the color balance correction. Note that the look-up tables applied to the respective color channels can be identical in a case where it is unnecessary to change a color balance to a specific one.

Note that an alternative publicly-known technique can be applied to the color balance and contrast corrections.

Further, the image processing section 202 can detect the skew of the image capture object by the method disclosed in (3-1) and carry out a process for rotating the captured image data so that the skew has an angle of 0 (zero) degree. Alternatively, the portable terminal apparatus 100 can transmit, to the image output apparatus 200, an angle of the skew which angle is detected in (3-1), together with the captured image data. Then, the image processing section 202 can carry out the process for rotating the captured image data in accordance with the angle of the skew which angle is received from the portable terminal apparatus 100 so that the skew of the captured image has the angle of 0 (zero) degree.

(8-3) Output Process Information

The above description discusses an arrangement in which the portable terminal apparatus 100 obtains and transmits the output process information to the image output apparatus 200. However, the embodiment is not limited to this. The image output apparatus 200 can obtain the output process information (the information indicative of the kind of the output process and the setting requirement for the output process) when obtaining the user information so as to carry out the user certification.

(8-4) Output Process

Before carrying out the filing process or the e-mail transmission process, the control section 212 of the image output apparatus 200 can convert, to a high-compression PDF, the captured image data processed by the image processing section 202. Note that the high-compression PDF refers to PDF data in which the image data is separated into a background part and a text part and optimum compression processes are carried out with respect to the respective parts. This allows favorable readability and a reduction in size of an image file.

Alternatively, before carrying out the filing process or the e-mail transmission process, the control section 212 can carry out an OCR (Optical Character Recognition) process with respect to the captured image data processed by the image processing section 202 so as to prepare text data. The control section 212 can convert the captured image data to a PDF, and then add the text data to the PDF as a transparent text. Note that the transparent text is data for superimposing (embedding) a recognized text on (in) the image data as text information so that the recognized text is apparently invisible. For example, an image file in which a transparent text is added to image data is generally used in a PDF file. Then, the control section 212 can cause PDF data, to which the prepared transparent text is added, to be outputted. This allows an output of an electronic document easy to utilize as if it were a file in which a text search can be carried out.

(8-5) Image Processing Section of the Image Output Apparatus

The above description discusses an arrangement in which the image processing section 202 of the image output apparatus 200 carries out corrections including the high resolution correction. Instead, the image output apparatus 200 can cause a server including an image processing section 202 to carry out, with respect to the captured image data, the high resolution correction and the other image processing such as the geometric distortion correction, the lens distortion correction, the contrast correction, and the color balance correction. Note, in this case, that the server will serve as an image output apparatus for carrying out the high resolution correction with respect to the captured image data received from the portable terminal apparatus 100, and for outputting the captured image data which has been subjected to the high resolution correction.

(8-6) Magnification of Resolution Conversion

According to the above description, the image processing section 202 of the image output apparatus 200 carries out the resolution conversion at the magnification of ×2 in each of the longitudinal and transverse directions. However, the present embodiment is not limited to this and can be alternatively arranged such that the magnification of the resolution conversion is specified by the user.

For example, when the text image capture mode is selected, the control section 109 of the portable terminal apparatus 100 controls the display section 105 to display a window which urges the user to enter, from the input section 106, a specified magnification at which the resolution conversion is carried out. Then, the control section 109 controls the communication section 104 so that information indicative of the specified magnification is included in the output process information and transmitted, together with the captured image data, to the image output apparatus 200.

Then, the image processing section 202 of the image output apparatus 200 carries out the resolution conversion in accordance with the specified magnification indicated by the output process information.

(9) Program and Recording Medium

The present invention can be achieved by recording, on a computer-readable recording medium in which a program to be executed by a computer is recorded, a method in which the image captured by the portable terminal apparatus 100 is transmitted to and outputted by the image output apparatus 200.

This makes it possible to portably provide a recording medium in which program codes (an executable program, an intermediate code program, and a source program) for carrying out the above process are recorded.

Note, in the present embodiment, that the recording medium can be a memory (not illustrated) such as a ROM or the recording medium itself can be a program medium (not illustrated) because the process is carried out by a microcomputer. Alternatively, the recording medium can be a program medium from which the program codes can be read out by carrying out loading of a recording medium with respect to a program reading device provided as an external storage apparatus (not illustrated).

In any case, an arrangement can be employed in which a stored program is executed by access of a microprocessor. Alternatively, in any case, a system can be employed in which the program codes are read out and downloaded on a program storage area (not illustrated) of the microcomputer, and then the program is executed. The program for the downloading is stored in a main body in advance.

Note here that the program medium is a recording medium which is arranged to be detachable from the main body. The program media can also be a medium fixedly bearing a program code which medium includes (i) a tape such as a magnetic tape or a cassette tape, (ii) a disk including a magnetic disk such as a flexible disk or a hard disk and an optical disk such as a CD-ROM, an MO, an MD, or a DVD, (iii) a card, such as an IC card (including a memory card) or an optical card, or (iv) a semiconductor memory of a mask ROM, EPROM (Erasable Programmable Read Only Memory), EEPROM (Electrically Erasable Programmable Read Only Memory), or a flash ROM.

Further, the present embodiment has a system architecture which is connectable to a communication network including the Internet. As such, the recording medium can be a medium which to bears the program codes in a flexible manner so that the program code is downloaded from the communication network. Note that, in a case where the program is downloaded from the communication network as described above, the program for the downloading can be stored beforehand in the main body or can be installed from an alternative recording medium. Note that the present invention can also be realized in a form of a computer data signal in which the program code is embodied by an electronic transmission and which is embedded in carrier waves.

The recording medium is read by a program scanning device included in the portable terminal apparatus 100 or the image output apparatus 200, whereby the image processing method is carried out.

As described earlier, an image output apparatus of the present invention includes: a receiving section for receiving, via a communication network, from a portable terminal apparatus including an image capture section, a single piece of captured image data which the image capture section has captured; a correction processing section for carrying out a high resolution correction for preparing, in accordance with the single piece of captured image data received by the receiving section, high resolution image data which has a higher resolution than the single piece of captured image data; and an output section for carrying out an output process in which the high resolution image data prepared by the correction processing section or an image indicated by the high resolution image data is outputted.

An image output method of the present invention, includes the steps of: (a) receiving, via a communication network, from a portable terminal apparatus including an image capture section, a single piece of captured image data which the image capture section has captured; (b) carrying out a high resolution correction for preparing, in accordance with the single piece of captured image data received in the step (a), high resolution image data which has a higher resolution than the single piece of captured image data; and (c) carrying out an output process in which the high resolution image data prepared in the step (b) or an image indicated by the high resolution image data is outputted.

According to the arrangement, the image output apparatus receives, via the communication network, from the portable terminal apparatus, data of an image captured by the portable terminal apparatus. This allows a user (i) to carry out image capture with respect to an image capture object which is provided so as to be away from the image output apparatus and (ii) to transmit, without the need of going to the image output apparatus, captured image data obtained from the image capture.

The image output apparatus prepares high resolution image data in accordance with a single piece of the captured image data received from the portable terminal apparatus, and then outputs the high resolution image data or an image indicated by the high resolution image data. This allows the user to easily obtain, from the image output apparatus, image data or an image which has a higher resolution than the image captured by the portable terminal apparatus. As such, for example, even in a case where image capture is carried out by a portable terminal apparatus with respect to an image capture object including a text image, it is possible to obtain, from the image output apparatus, an image in which a text included in the text image is enhanced in readability.

The image output apparatus of the present invention is preferably arranged such that: an object whose image is captured by the image capture section has a rectangular plane on which a text image is formed; and the correction processing section (i) corrects a distortion of the rectangular plane in the captured image data, the distortion occurring when the image capture section captured image data in a direction different from a normal direction of the rectangular plane and (ii) carries out the high resolution correction.

According to the arrangement, a user can easily obtain an undistorted image from an image output apparatus even if image capture is obliquely carried out with respect to an image capture object.

The image output apparatus of the present invention is preferably arranged such that: an object whose image is captured by the image capture section has a rectangular plane on which a text image is formed; and the correction processing section (i) corrects a lens distortion in which the rectangular plane has a curved edge in captured image data obtained by the image capture section and (ii) carries out the high resolution correction.

According to the arrangement, a user can easily obtain, from an image output apparatus, an image which has no lens distortion.

The image output apparatus of the present invention is preferably arranged such that the output section carries out, as the output process, a printing process in which an image which corresponds to the high resolution image data is formed on recording paper.

According to the arrangement, a user can easily obtain, from an image output apparatus, a printed matter on which an image which has a higher resolution than a captured image is printed.

The image output apparatus of the present invention is preferably arranged such that the output section carries out, as the output process, a storing process in which the high resolution image data is stored in an external storage apparatus. Alternatively, the image output apparatus of the present invention is preferably arranged such that the output section carries out, as the output process, an e-mail transmission process in which an e-mail, to which the high resolution image data is attached, is transmitted.

According to the arrangement, a user can easily obtain, from an image output apparatus, data of an image which has a higher resolution than a captured image.

The image output apparatus of the present invention is preferably arranged such that: an object whose image is captured by the image capture section has a text image; and the output section outputs the high resolution image data in a state where the high resolution image data is separated into (i) a region which corresponds to the text image and (ii) the other region and the regions are compressed at respective different compression ratios.

According to the arrangement, it is possible to cause the high resolution image data to have less capacity. This allows a reduction in load imposed on communication during the output.

The image output apparatus of the present invention is preferably arranged such that: an object whose image is captured by the image capture section has a text image; and the output section extracts a text from a region of the high resolution image data which region corresponds to the text image, converts the text to text data, and then outputs the high resolution image data to which the text data is added.

According to the arrangement, a user can easily carry out a text search by use of text data.

A portable terminal apparatus capable of communicating, via a communication network, with an image output apparatus as mentioned above, said portable terminal apparatus includes: an image capture section for capturing an image of an object having a rectangular plane on which a text image is formed; a captured image determination section for determining whether or not the single piece of captured image data which the image capture section has captured meets a given requirement; and a transmission section for transmitting, to the image output apparatus, captured image data which is determined, by the captured image determination section, to meet the given requirement, the given requirement including a requirement A, the requirement A being such that features fall within a given range, the features indicative of a degree of a distortion of the rectangular plane in the captured image data, the distortion occurring when the image capture section captured image data in a direction different from a normal direction of the rectangular plane.

Note here that examples of the identical image capture object which has the rectangular plane include document paper or a poster on which a text image is formed, a screen projected by a projector or the like, and a screen included in a display device.

According to the arrangement, the portable terminal apparatus transmits the captured image data only in a case where the features indicative of a degree of the distortion fall within the given range. For this reason, the captured image data transmitted to the image output apparatus has a distortion which is relatively small. This allows a transmission, to the image output apparatus, of only captured image data in which the rectangular plane has a relatively small distortion.

Further, a variety of methods have been known as a method for correcting a distortion of the rectangular plane which distortion occurs in the captured image data due to the image capture which is carried out by the image capture section from the direction different from the normal direction of the rectangular plane. However, in a case where the distortion occurs to a large degree, it is difficult to securely obtain an undistorted image even if such a correction is carried out. However, according to the arrangement, the portable terminal apparatus transmits the captured image data only in a case where the features indicative of a degree of the distortion fall within the given range. For this reason, the captured image data transmitted to the image output apparatus has a distortion which is relatively small. This is because the rectangular plane is distorted to the degree that falls within the given range. As a result, in a case where the image output apparatus carries out a correction for the distortion, the distortion can be securely corrected in the image output apparatus.

A portable terminal apparatus capable of communicating, via a communication network, with an image output apparatus as mentioned above, said portable terminal apparatus includes: an image capture section for capturing an image of an object having a rectangular plane on which a text image is formed; a captured image determination section for determining whether or not the single piece of captured image data which the image capture section has captured meets a given requirement; and a transmission section for transmitting, to the image output apparatus, captured image data which is determined, by the captured image determination section, to meet the given requirement, the given requirement including a requirement B, the requirement B being such that a skew angle of the rectangular plane in captured image data falls within a given range.

Assume that a rectangular object is skewed in a captured image. Even if a high resolution image is obtained from an image output apparatus, a document is also skewed in the high resolution image. However, according to the arrangement, the portable terminal apparatus transmits the captured image data only in a case where the angle of the skew falls within the given range. Note here that the given range refers to a range including 0°, for example, within 0±15°. Such a setting allows a prevention of an image which is steeply skewed from being transmitted to the image output apparatus.

The portable terminal apparatus of the present invention is preferably arranged to further include a notification section for notifying a user of need to carry out capture an image again in a case where the captured image determination section determines that no given requirement is met.

According to the arrangement, the user can easily grasp that it is necessary to carry out image capture again so as to obtain a high resolution image from the image output apparatus. This makes it possible to take an immediate step to carry out image capture.

A captured image processing system of the present invention includes: a portable terminal apparatus as mentioned above; and an image output apparatus as mentioned above for receiving captured image data from the portable terminal apparatus.

According to the arrangement, a user can easily obtain a high resolution image which is an image captured by a portable terminal apparatus and has a higher resolution than the image.

Note that it is possible to cause a computer to realize a portable terminal apparatus and an image output apparatus which are mentioned above. In this case, (i) a program for causing a computer to realize the portable terminal apparatus and the image output apparatus by causing the computer to operate as each section mentioned above and (ii) a computer-readable storage medium in which the program is recorded are both encompassed in the scope of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to a captured image processing system for carrying out data communication between a portable terminal apparatus and an image output apparatus.

REFERENCE SIGNS LIST

100 Portable terminal apparatus
200 Image output apparatus
101 Image capture section
102 Captured image determination section
103 Image processing section
104 Communication section (Transmission section)
105 Display section (Notification section)
106 Input section
109 Control section (Transmission section, Notification section)
202 Image processing section (Correction processing section)
204 Image forming section (Output section)
205 Display section
206 Input section
207 First communication section (Receiving section)
208 Second communication section (Output section)
212 Control section (Output section)

The invention claimed is:

1. A captured image processing system comprising:
a portable terminal apparatus; and
an image output apparatus for receiving captured image data from the portable terminal apparatus,
the portable terminal apparatus including:
an image capture section for capturing an image of an object having a rectangular plane on which a text image is formed;
a captured image determination section for determining whether or not a single piece of captured image data which the image capture section has captured meets a given requirement; and
a transmission section for transmitting, to the image output apparatus, captured image data which is determined, by the captured image determination section, to meet the given requirement,
the given requirement including a requirement A,
the requirement A being such that features fall within a given range, the features indicative of a degree of a geometric distortion of the rectangular plane in the captured image data, the geometric distortion occurring when the image capture section captured image data by pointing the image capture section to the rectangular plane in an oblique direction with respect to a normal direction of the rectangular plane,
the image output apparatus including:
a receiving section for receiving, via a communication network, from a portable terminal apparatus including an image capture section, the single piece of captured image data which the image capture section has captured;
a correction processing section for carrying out a high resolution correction for preparing, in accordance with the single piece of captured image data received by the receiving section, high resolution image data which has a higher resolution than the single piece of captured image data; and
an output section for carrying out an output process in which the high resolution image data prepared by the correction processing section or an image indicated by the high resolution image data is outputted.

2. The captured image processing system as set forth in claim 1, wherein:
an object whose image is captured by the image capture section has a rectangular plane on which a text image is formed; and
the correction processing section (i) corrects a distortion of the rectangular plane in the captured image data, the distortion occurring when the image capture section captured image data in a direction different from a normal direction of the rectangular plane and (ii) carries out the high resolution correction.

3. The captured image processing system as set forth in claim 1, wherein:
an object whose image is captured by the image capture section has a rectangular plane on which a text image is formed; and
the correction processing section (i) corrects a lens distortion in which the rectangular plane has a curved edge in captured image data obtained by the image capture section and (ii) carries out the high resolution correction.

4. The captured image processing system as set forth in claim 1, wherein the output section carries out, as the output process, a printing process in which an image which corresponds to the high resolution image data is formed on recording paper.

5. The captured image processing system as set forth in claim 1, wherein the output section carries out, as the output process, a storing process in which the high resolution image data is stored in an external storage apparatus.

6. The captured image processing system as set forth in claim 5, wherein:
an object whose image is captured by the image capture section has a text image; and
the output section outputs the high resolution image data in a state where the high resolution image data is separated into (i) a region which corresponds to the text image and (ii) the other region and the regions are compressed at respective different compression ratios.

7. The captured image processing system as set forth in claim 5, wherein:
an object whose image is captured by the image capture section has a text image; and
the output section extracts a text from a region of the high resolution image data which region corresponds to the text image, converts the text to text data, and then outputs the high resolution image data to which the text data is added.

8. The captured image processing system as set forth in claim 1, wherein the output section carries out, as the output process, an e-mail transmission process in which an e-mail, to which the high resolution image data is attached, is transmitted.

9. The captured image processing system as set forth in claim 8, wherein:
an object whose image is captured by the image capture section has a text image; and
the output section outputs the high resolution image data in a state where the high resolution image data is separated into (i) a region which corresponds to the text image and (ii) the other region and the regions are compressed at respective different compression ratios.

10. The captured image processing system as set forth in claim 8, wherein:
an object whose image is captured by the image capture section has a text image; and the output section extracts a text from a region of the high resolution image data which region corresponds to the text image, converts the text to text data, and then outputs the high resolution image data to which the text data is added.

11. The captured image processing system as set forth in claim 1,
wherein the given requirement includes a requirement B,
the requirement B being such that a skew angle of the rectangular plane in captured image data falls within a given range.

12. A portable terminal apparatus that communicates, via a communication network, with an image output apparatus,
the image output apparatus including:
a receiving section for receiving a single piece of captured image data via a communication network;
a correction processing section for carrying out a high resolution correction for preparing, in accordance with the single piece of captured image data received by the receiving section, high resolution image data which has a higher resolution than the single piece of captured image data; and
an output section for carrying out an output process in which the high resolution image data prepared by the correction processing section or an image indicated by the high resolution image data is outputted,
said portable terminal apparatus, comprising:
an image capture section for capturing an image of an object having a rectangular plane on which a text image is formed;
a captured image determination section for determining whether or not the single piece of captured image data which the image capture section has captured meets a given requirement; and
a transmission section for transmitting, to the image output apparatus, captured image data which is determined, by the captured image determination section, to meet the given requirement,
the given requirement including a requirement A,
the requirement A being such that features fall within a given range, the features indicative of a degree of a geometric distortion of the rectangular plane in the captured image data, the geometric distortion occurring when the image capture section captured image data by pointing the image capture section to the rectangular plane in an oblique direction with respect to a normal direction of the rectangular plane.

13. The portable terminal apparatus as set forth in claim 12,
wherein the given requirement includes a requirement B,
the requirement B being such that a skew angle of the rectangular plane in captured image data falls within a given range.

14. The portable terminal apparatus as set forth in claim 12, further comprising:
a notification section for notifying a user of need to carry out capture an image again in a case where the captured image determination section determines that no given requirement is met.

15. A portable terminal apparatus that communicates, via a communication network, with an image output apparatus including an output section for carrying out an output process in which a single piece of captured image data received is outputted,
said portable terminal apparatus, comprising:
an image capture section for capturing an image of an object having a rectangular plane on which a text image is formed;
a captured image determination section for determining whether or not the single piece of captured image data which the image capture section has captured meets a given requirement; and
a transmission section for transmitting, to the image output apparatus, captured image data which is determined, by the captured image determination section, to meet the given requirement,
the given requirement including a requirement A,
the requirement A being such that features fall within a given range, the features indicative of a degree of a geometric distortion of the rectangular plane in the captured image data, the geometric distortion occurring when the image capture section captured image data by pointing the image capture section to the rectangular plane in an oblique direction with respect to a normal direction of the rectangular plane.

* * * * *